United States Patent
Bayesteh et al.

(10) Patent No.: US 11,903,024 B2
(45) Date of Patent: Feb. 13, 2024

(54) SYSTEMS AND METHODS FOR SENSING IN HALF DUPLEX NETWORKS

(71) Applicants: Alireza Bayesteh, Ottawa (CA); Mohammadhadi Baligh, Ottawa (CA)

(72) Inventors: Alireza Bayesteh, Ottawa (CA); Mohammadhadi Baligh, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 28 days.

(21) Appl. No.: 17/496,076

(22) Filed: Oct. 7, 2021

(65) Prior Publication Data

US 2022/0030626 A1    Jan. 27, 2022

Related U.S. Application Data

(63) Continuation of application No. 16/564,671, filed on Sep. 9, 2019, now Pat. No. 11,178,691.

(51) Int. Cl.
*H04W 16/28* (2009.01)
*H04W 76/27* (2018.01)
(Continued)

(52) U.S. Cl.
CPC ....... *H04W 74/0808* (2013.01); *H04W 16/28* (2013.01); *H04W 52/146* (2013.01);
(Continued)

(58) Field of Classification Search
CPC ........ G01S 7/006; G01S 13/003; G01S 13/46; H04B 7/0413; H04W 16/28; H04W 52/146; H04W 52/243; H04W 74/0808
(Continued)

(56) References Cited

U.S. PATENT DOCUMENTS

| | | |
|---|---|---|
| 2015/0097702 A1 | 4/2015 | Kim |
| 2016/0259041 A1 | 9/2016 | Tan et al. |

(Continued)

FOREIGN PATENT DOCUMENTS

| | | |
|---|---|---|
| CN | 109532737 A | 3/2019 |
| WO | 2018182723 A1 | 10/2018 |
| WO | 2021030685 A1 | 2/2021 |

OTHER PUBLICATIONS

Samsung: Cross-link interferencemanagement based on power control 3GPP Draft; R1 1716038 3rd Generationpartnership Project (3GPP) Mobilecompetence Centre;650 Route Deslucioles; F-06921 Sophia-Antipolis Cedex; Franceivol. RAN WG1 2017092117 SeptemberXP051339497 No. Nagoya, Japan; Sep. 18, 2017 2017 (Sep. 17, 2017).

(Continued)

*Primary Examiner* — Harun Chowdhury

(57) ABSTRACT

Aspects of the present disclosure relate to integration of sensing and wireless communications. Wireless communication networks can configure and implement both sensing signals and communication signals. Sensing signals, or sensing reference signals, can be used to determine properties of the environment, and do not carry any information or data for the purpose of communications. Communication signals, on the other hand, are signals that carry information or data between network entities. Sensing agents can be used for both passive and active sensing. Sensing agents may be dedicated devices capable of performing passive sensing, active sensing, or both. Sensing agents can also be existing networks device such as user equipment or transmit receive points. Methodologies described here may be particularly beneficial for half-duplex systems, but could also be implemented in full duplex systems.

19 Claims, 9 Drawing Sheets

(51) Int. Cl.
  H04W 52/24    (2009.01)
  H04W 52/14    (2009.01)
  H04W 80/02    (2009.01)
  H04W 72/54    (2023.01)
  H04L 5/16     (2006.01)

(52) U.S. Cl.
  CPC ......... *H04W 52/243* (2013.01); *H04W 72/54* (2023.01); *H04W 76/27* (2018.02); *H04W 80/02* (2013.01); *H04L 5/16* (2013.01)

(58) Field of Classification Search
  USPC ................................. 370/252, 254, 278, 329
  See application file for complete search history.

(56) References Cited

U.S. PATENT DOCUMENTS

| | | | |
|---|---|---|---|
| 2018/0124733 A1 | 5/2018 | Vilaipornsawai et al. | |
| 2018/0242253 A1 | 8/2018 | Jetcheva | |
| 2020/0260440 A1* | 8/2020 | Yasukawa | H04W 74/0825 |
| 2020/0264266 A1* | 8/2020 | Hassanien | H04B 7/0413 |
| 2022/0236403 A1* | 7/2022 | Schweizer | G01S 13/003 |

OTHER PUBLICATIONS

Nokia, Nokia Shanghai Bell, Unresolved aspects of Mode 3 UE sensing in the shared resource pool. 3GPP TSG-RAN WG2 Meeting #103, Gothenburg, Sweden, Aug. 20-24, 2018, R2-1812319, 2 pages.

Knill, Christina, et al., "High Range and Doppler Resolution by Application of Compressed Sensing Using Low Baseband Bandwidth OFDM Radar", IEEE Transactions on Microwave Theory and Techniques, Jul. 2018, pp. 3535-3546, vol. 66, No. 7.

Braun, Martin, et al., "Maximum likelihood speed and distance estimation for OFDM radar". Proc. 2010 IEEE Radar Conf., Washington, DC, May 2010, pp. 256-261.

Braun, Martin, et al., "Parameterization of joint OFDM-based radar and communication systems for vehicular okpplications". Proc. 20th IEEE Int. Symp. Personal, Indoor, Mobile Radio Communications, Tokyo, Japan, Sep. 2009, pp. 3020-3024.

Donnet, B.J., and Longstaff, I.D. "Combining MIMO radar with OFDM communications". Proc. Third European Radar Conf., Manchester U.K., Sep. 2006, pp. 37-40.

Yang, Yang and Blum, Rick S., "MIMO radar waveform design based on mutual information and minimum mean-square error estimation", IEEE Transactions on Aerospace and Electronic Systems, Jan. 2007, pp. 330-343, vol. 13, No. 1.

Sturm, Christian and Wiesbeck, Werner, "Waveform Design and Signal Processing Aspects for Fusion of Wireless Communications and Radar Sensing", Proceedings of the IEEE, Jul. 2011, pp. 1236-1259, vol. 99, No. 7.

Bradaric, I., et al., "Multistatic Radar Systems Signal Processing", 2006 IEEE Conference on Radar, Apr. 2006, pp. 106-113.

* cited by examiner

SYSTEMS AND METHODS FOR SENSING IN HALF DUPLEX NETWORKS

RELATED APPLICATIONS

This application is a continuation application of U.S. patent application Ser. No. 16/564,671 filed on Sep. 9, 2019, which is incorporated herein by reference in its entirety.

TECHNICAL FIELD

The present disclosure relates generally to wireless communications, and in particular embodiments, for sensing in half duplex networks.

BACKGROUND

In some wireless communication networks, user equipments (UEs) wirelessly communicate with a base station to send data to the base station and/or to receive data from the base station. A wireless communication from a UE to a base station is referred to as an uplink (UL) communication, and a wireless communication from a base station to a UE is referred to as a downlink (DL) communication. A wireless communication from a first UE to a second UE is referred to as a sidelink (SL) communication or a device-to-device (D2D) communication.

Sensing in the form of radar has been used for a long time in military applications and more recently in the car industry with a goal of detecting a target's range, velocity and shape. While originally radar was been implemented as stand-alone application, many research works have studied the possibility of integration between radar and communications. It has been shown that radar sensing and communications can use the same hardware and the same waveform in order to perform in an integrated fashion. The main focus of these research works has involved waveform design, including single-carrier, multi-carrier, ultra-wide band (UWB) pulse and Frequency-Modulated Continuous Wave (FMCW).

Commercial communications networks today consist of half-duplex nodes. Although there are many practical implementations for full-duplex systems that show promising performance, even if full duplex nodes become practical in the future, a majority of wireless network nodes will likely still be half-duplex. Full duplex implementation is more challenging in higher frequencies (like millimeter wave bands) and it is very challenging in low cost nodes (like in FemtoCells) and for user equipment (UEs). Wireless communications can potentially be improved when properties of a wireless communication network and its surrounding environment are known.

SUMMARY

Sensing signals or sensing reference signals can be used to determine properties of a wireless communication network and its surrounding environment. Such properties could include the location and/or velocity of UEs, and the location and/or velocity of scattering objects that obstruct communication signals. The concept of using a sensing agent for active sensing and/or passive sensing is introduce to enable sensing to be performed in a communication network. Active sensing as used herein is intended as the transmission of a sensing reference signal. Passive sensing as used herein is intended as the detection of a reflection of a sensing reference signal. The sensing agent can be a stand-alone dedicated device, a UE or even a combination of multiple transmit receive points (TRPs).

According to a first aspect of the disclosure, there is provided a method for use in a telecommunication system. The method involves a sensing agent receiving configuration information for configuring transmission of a sensing reference signal (SeRS) to be transmitted by the sensing agent during a transmission resource of a first transmit receive point (TRP). The method also involves the sensing agent transmitting the SeRS based on the configuration information.

In some embodiments, the method further involves the sensing agent performing passive sensing on a reflection of a downlink transmission from the first TPR.

In some embodiments, the method further involves the sensing agent notifying the first TRP of sensing information resulting from the passive sensing on the reflection of the downlink transmission from the TPR.

In some embodiments, the method further involves the sensing agent receiving configuration information for configuring when the sensing agent can perform passive sensing of a reflection from transmission by the first TRP.

In some embodiments, the method further involves the sensing agent receiving configuration information for configuring when the sensing agent can perform passive sensing of a reflection from transmission by one or more other TRP; and the sensing agent performing sensing of a reflection from the one or more other TRP.

In some embodiments, the method further involves the sensing agent notifying at least one of the first TRP or the one or more other TRP of sensing information resulting from performing passive sensing of the reflection by the one or more other TRP.

In some embodiments, the sensing agent is a user equipment (UE).

In some embodiments, the method further involves the UE receiving a sensing node identifier (ID).

In some embodiments, the UE transmits the SeRS on a first beam and the UE uses a different beam for uplink, downlink or sidelink telecommunications transmissions.

In some embodiments, receiving the configuration information occurs in one or more of: L1 signalling; Radio resource control (RRC) signaling; media access control (MAC) control elements (CEs); and X2/Xn signaling.

In some embodiments, the sensing agent notifying the first TRP of sensing information occurs in one or more of: L1 signalling; Radio resource control (RRC) signaling; media access control (MAC) control elements (CEs); and X2/Xn signaling.

According to a second aspect of the disclosure, there is provided a method for use in a telecommunication system. The method involves a transmit receive point (TRP) transmitting configuration information for configuring transmission of a sensing reference signal (SeRS) to be transmitted by a sensing agent during a transmission resource of the TRP. The method also involves the TRP detecting a reflection of the SeRS transmitted by the sensing agent based on the configuration information.

In some embodiments, the method further involves the TRP performing sensing parameter estimation regarding a surrounding environment of the TRP based on the detected reflection.

In some embodiments, the method further involves the TRP performing interference suppression to suppress interference between uplink transmissions and at least one of: the SeRS from the TRP; and SeRS from other TRP or sensing agents.

In some embodiments, performing interference suppression comprises at least one of: joint radar estimation and data decoding using maximum likelihood estimation or successive interference cancellation; receiving beamforming to separate at least one reflected SeRS and uplink transmissions; and scheduling and power control for uplink users to minimize interference.

In some embodiments, the method further involves transmitting configuration information for configuring sensing of a reflection of a SeRS transmitted by the TRP during a transmission resource of the first TRP.

In some embodiments, the method further involves the TRP receiving sensing parameter estimation information from one or more sensing agents regarding a surrounding environment of the TRP.

In some embodiments, the method further involves the TRP notifying neighbouring TRPs of received sensing parameter estimation information from one or more sensing agents regarding the surrounding environment of the TRP.

In some embodiments, transmitting the configuration information occurs in one or more of: L1 signalling; Radio resource control (RRC) signaling; media access control (MAC) control elements (CEs); and X2/Xn signaling.

In some embodiments, receiving sensing parameter estimation information occurs in one or more of: L1 signalling; Radio resource control (RRC) signaling; media access control (MAC) control elements (CEs); and X2/Xn signaling.

According to a third aspect of the disclosure, there is provided a method for use in a telecommunication system. The method involves a sensing agent receiving configuration information for configuring passive sensing of a reflection of a sensing reference signal (SeRS) by one or more TRP during a transmission resource of the one or more TRP. The method also involves the sensing agent detecting the reflected SeRS based on the configuration information.

In some embodiments, the method further involves the sensing agent notifying a first TRP of the one or more TRP of sensing information resulting from the detecting the reflected SeRS of the first TRP.

In some embodiments, the method further involves the sensing agent receiving configuration information for configuring receipt of a reflected SeRS, the SeRS to be transmitted by a second TRP of the one or more TRP during a transmission resource of the second TRP; and the sensing agent detecting the reflected SeRS based on the configuration information.

In some embodiments, the method further involves the sensing agent notifying at least one of the first TRP or the second TRP of sensing information resulting from the detecting the reflected SeRS transmitted by the second TRP.

In some embodiments, receiving the configuration information occurs in one or more of: L1 signalling; Radio resource control (RRC) signaling; media access control (MAC) control elements (CEs); and X2/Xn signaling.

In some embodiments, the method further involves the sensing agent notifying the at least one of the first TRP or the second TRP of sensing information occurs in one or more of: L1 signalling; Radio resource control (RRC) signaling; media access control (MAC) control elements (CEs); and X2/Xn signaling.

According to a fourth aspect of the disclosure, there is provided a method for use in a telecommunication system. The method involves a transmit receive point (TRP) transmitting a sensing reference signal (SeRS) during a transmission resource of the TRP. The method also involves the TRP receiving sensing parameter estimation information from one or more sensing agents regarding a surrounding environment of the TRP.

In some embodiments, at least one of the one or more sensing agents are neighbouring TRPs.

In some embodiments, the neighbouring TRPs are in an uplink portion of their respective transmission resources.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1:
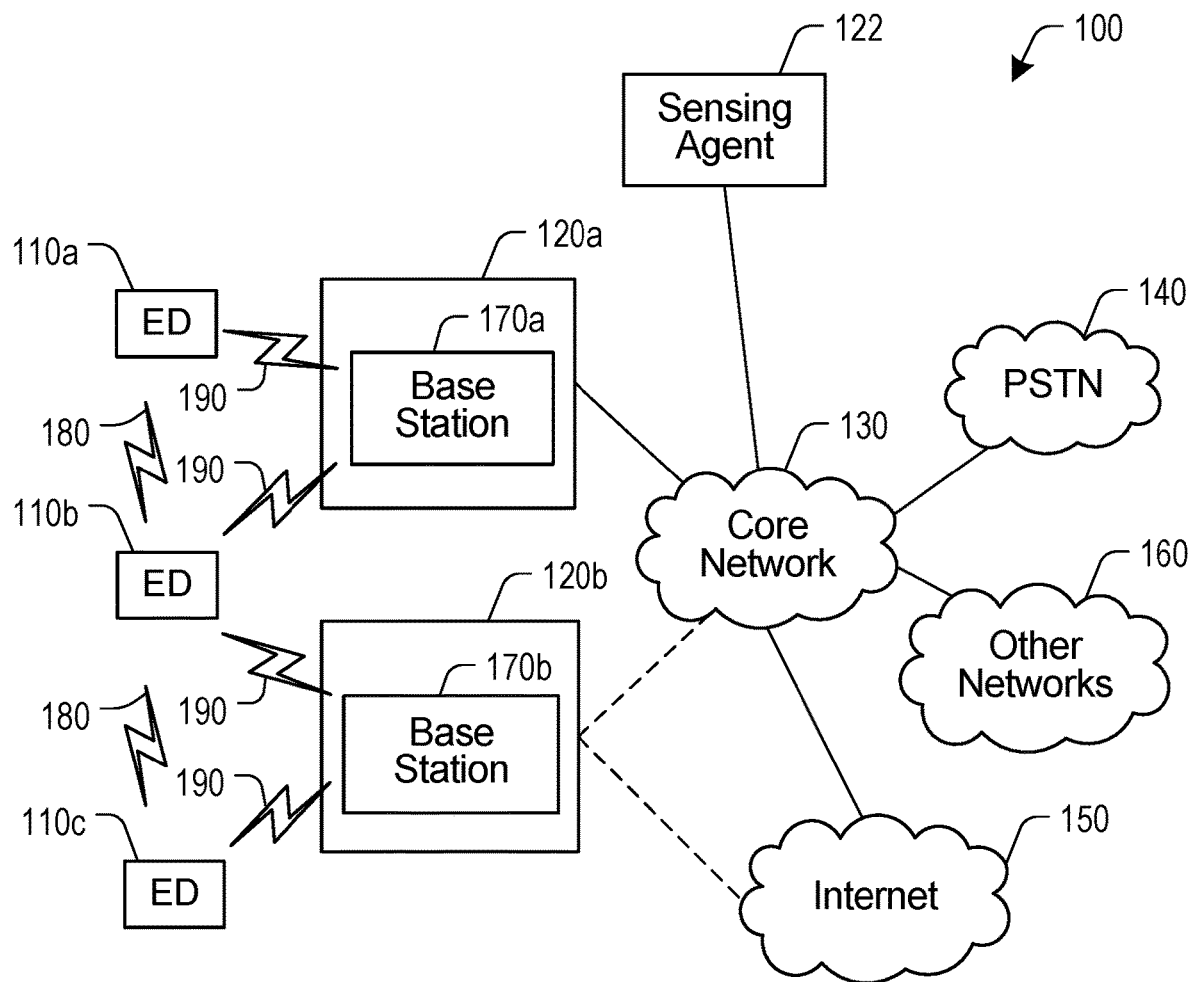
FIG. 1 is a schematic diagram of a communication system in which embodiments of the disclosure may occur.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Some aspects of the present disclosure relate to sensing in a wireless communication network, which allows the network to determine information regarding the surrounding environment. For example, sensing could determine the location, shape and/or velocity of one or more objects in the environment. These objects could include network entities that communicate within the network and scattering objects that can potentially disrupt communications in the network. A benefit of sensing is that the network can configure communication signals between network entities based on measured properties of the current environment.

By way of example, when the location of a transmitter, an intended receiver, and any potential scattering objects are known to the network, the network can determine a trajectory from the transmitter to the intended receiver that avoids the scattering objects or is least impacted by the scattering objects. Based on this trajectory, the network can configure a suitable communication signal for transmission to the intended receiver. Beamforming is one method that can be used to direct signals along a particular trajectory. When the trajectory to the intended receiver has been determined with a desired precision, narrow beamforming can be implemented for communication with that intended receiver. Narrow beamforming can increase the received power at the intended receiver, and reduce interference for other receivers in the network. Having knowledge of the velocity of the intended receiver can also allow the network to predict the future location of the intended receiver and configure future communication signals to that receiver accordingly.

One method for sensing is radar. Radar has been previously used in military applications and in the car industry, often with the goal of detecting the range, velocity and/or shape of certain objects. Conventionally, radar has been implemented as stand-alone application.

After a radar signal is transmitted, a reflection of that radar signal off of an object can be received and measured. These reflections can indicate certain properties of the object, non-limiting examples of which include range, location, shape, speed and velocity of the object. The range of the object (for example, the distance from the receiver of the radar signal to the object) can be determined based on the time-of-flight for the radar signal, and/or by using frequency modulation. The location of the object can be determined based on the range of the object and the direction that the radar signal was transmitted and/or received. For example, beamforming can be used to transmit radar signals in particular directions. The velocity and/or speed of an object can be determined based on a change in the objects position over time, and/or based on the Doppler shift of the received radar signal.

Radar systems can be monostatic and/or bistatic. In monostatic radar, the transmitter of a radar signal is also used to receive the reflection of the radar signal. In bistatic radar, the transmitter of a radar signal is different from the receiver of the reflection of the radar signal.

There are fundamental bounds on range resolution and velocity resolution for a radar signal, which depend on the transmission time ($T_W$), bandwidth (BW) and carrier frequency ($f_c$) of the radar signal. These fundamental bounds exist regardless of the waveform and transmission scheme of the radar signal. The equations for range resolution ($\Delta R$) and velocity resolution ($\Delta v$) are provided below:

$$\Delta R \geq \frac{c_0}{2BW} \qquad \text{(Equation 1)}$$

$$\Delta v \geq \frac{c_0}{2T_w f_c} \qquad \text{(Equation 2)}$$

In equation 1 and equation 2 above, $c_0$ denotes the speed of light. Based on these equations, to improve range resolution a larger bandwidth is needed, and to improve velocity resolution a larger transmission time and/or a higher carrier frequency is needed.

In wireless networks, a key challenge of sensing in half duplex is the fact that a receiver cannot listen to a reflected signal before transmission of the signal is completed. When the distance between the transmitter and the targets is limited, it is highly possible that the receiver may miss the reflection completely by the time the transmission ends. This means that if the same node is to be used for sensing in the half duplex mode, the only viable solution is to use a very narrow pulse (like in pulse radar). For example, assuming a target is 300 meters away, a delay between a received signal (reflected from the target) and the transmitted signal is 2 μs and hence, a pulse duration should be less than 2 μs to make sure the reflection is not missed by the receiver. In reality, this constraint is more severe as there are reflectors and targets within a distance of much less than 300 meters. Having such a constraint on the pulse duration has the following drawbacks:

It limits the opportunity of integration with communications signals and equipment, which mainly utilizes OFDM waveforms. The symbol duration for OFDM transmissions is much longer than this to accommodate a cyclic prefix (CP). It can be multiplexed with communication signals using time domain multiplexing (TDM), but signal overhead involved in doing so is not justifiable. Also, it is not clear whether or not the same radio frequency (RF) chain can be used for both sensing and communications.

Having a narrow pulse for sensing limits accuracy of target velocity estimation.

In view of the above constraints, it turns out that using the same transceiver for sensing is not practical for half duplex nodes. Therefore, other solutions are needed to enable efficient sensing in half duplex systems.

This is not a big issue in traditional radar systems, as either full duplex capability is considered by having good isolation between transmitter and receiver hardware and/or due to a large distance between the transmitter and target, such that round trip delay allows for listening to the reflected signal after transmission is completed.

Some aspects of the present disclosure relate to the integration of sensing and wireless communications. For example, wireless communication networks could configure and implement both sensing signals and communication signals. Sensing signals, which could also be referred to as sensing reference signals, are used to determine properties of the environment, and do not carry any information or data for the purpose of communications. Communication signals, on the other hand, are signals that carry information or data between network entities. A possible benefit of implementing both sensing and communications operations is that the network can configure communication signals based on the information determined from sensing. This is referred to as sensing-assisted communications. For example, sensing could determine the location of an intended receiver and enable narrow beamforming to that receiver. Communication-assisted sensing is also contemplated. Sensing signals and communication signals could be implemented using the same hardware and/or the same waveform in order to operate in an integrated fashion.

Sensing agents are nodes in a network that can assist in the sensing operation. These nodes can be stand-alone nodes dedicated to just sensing operations or other nodes (for example transmit and receive points (TRPs) or UEs) doing the sensing operations in parallel with communication transmissions. In cases where the sensing agents are implemented as stand-alone nodes, the sensing can be implemented in the vicinity of some corresponding TRPs to ensure that the distance between the TRP and a target is approximately the same as the distance between the sensing agent and the target to simplify range estimation. Another condition than needs consideration is that the sensing agent and the TRP are synchronized in time and frequency (for example, by accessing the same clock for time synchronization).

FIGS. 1, 2A, 2B and 2C illustrate examples of networks and devices that could implement any or all aspects of the present disclosure.

FIG. 1 illustrates an example communication system 100. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a sensing agent 122, a core network 130, a public switched telephone network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

Any or all of the EDs 110a-110c and base stations 170a-170b could be sensing nodes in the system 100. Sensing nodes are network entities that perform sensing by transmitting and/or receiving sensing signals. Some sensing nodes are communication equipment that perform both communications and sensing. However, some sensing nodes do not perform communications, and are instead dedicated to sensing. The sensing agent 122 is an example of a sensing node that is dedicated to sensing. Unlike the EDs 110a-110c and base stations 170a-170b, the sensing agent 122 does not transmit or receive communication signals. However, this does not exclude the sensing agent 122 from communicating configuration information, sensing information, or other information within the communication system 100. The sensing agent 122 is in communication with the core network 130 to communicate information with the rest of the communication system 100. By way of example, the sensing agent 122 may determine the location of the ED 110a, and transmit this information to the base station 170a via the core network 130. Although only one sensing agent 122 is shown in FIG. 1, any number of sensing agents may be implemented in the communication system 100. In some embodiments, one or more sensing agents could be implemented at the RANs 120a-120b.

The EDs 110a-110c, base stations 170a-170b and sensing agent 122 are examples of network entities that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells where the radio access technology supports such. In some embodiments, multiple non-collocated transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), Space Division Multiple Access (SDMA), orthogonal FDMA (OFDMA), or single-carrier FDMA (SC-FDMA) in the air interfaces 190. In addition, the communication system 100 may operate in time division duplex (TDD) and/or frequency division duplex (FDD) modes.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170a-170b may establish an air interface 190 with Evolved UTMS Terrestrial Radio Access (E-UTRA) using LTE, LTE-A, New Radio (NR) and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c communicate with one another over one or more sidelink (SL) air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110a-110c communication with one or more of the base stations 170a-170c, or they may be substantially different. For example, the communication system 100 may implement one or more channel access methods, such as code division multiple access (CDMA), time division multiple access (TDMA), frequency division multiple access (FDMA), Space Division Multiple Access (SDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum. In addition, the SL air interfaces 180 may operate in time division duplex (TDD) and/or frequency division duplex (FDD) modes.

Some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support multiple radio access technologies.

The base stations 170a-170b, the EDs 110a-110c, and the sensing agent 122 can perform or aid in sensing by transmitting and/or receiving sensing signals (not shown). The sensing signals can be used to determine properties of the communication system 100 and its surrounding environment. For exampling, sensing signals could be used to determine the location and/or velocity of the EDs 110a-110c. Similar to the air interfaces 190 and/or the SL air interfaces 180, the sensing signals could utilize any suitable radio access technology. In some embodiments, sensing signals occupy the millimeter band (also referred to as the extremely high frequency band). Possible advantages of millimeter band include a relatively large amount of bandwidth available for sensing and a stronger reflection of the sensing signals from objects, as some materials reflect millimeter waves more strongly than other radio bands.

Figure 2A:
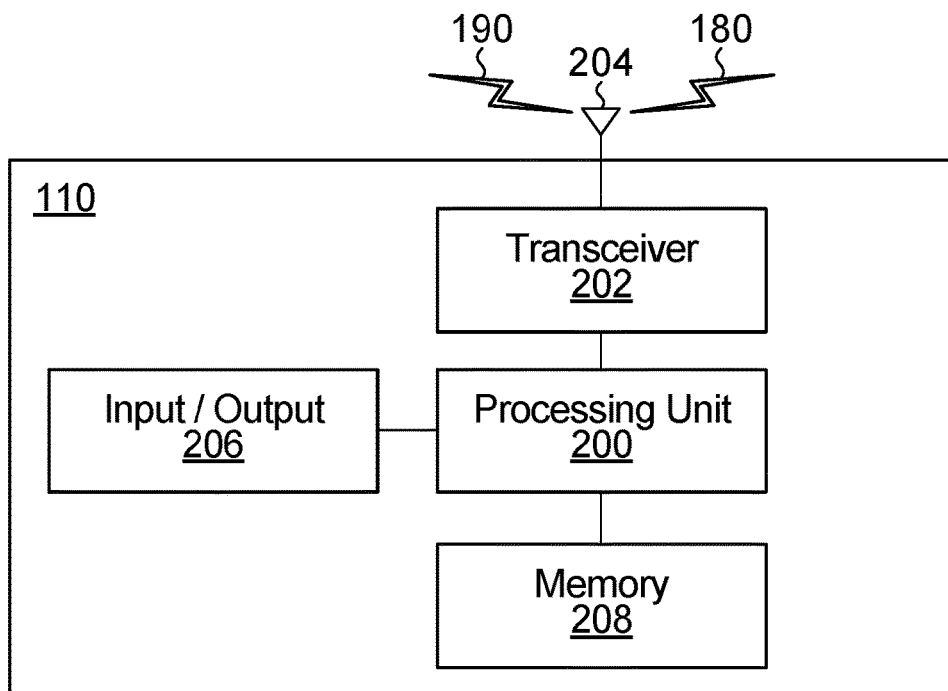
FIGS. 2A, 2B and 2C are block diagrams of an example user equipment, base station and sensing agent, respectively, according to aspects of the present disclosure.
Figure 2B:
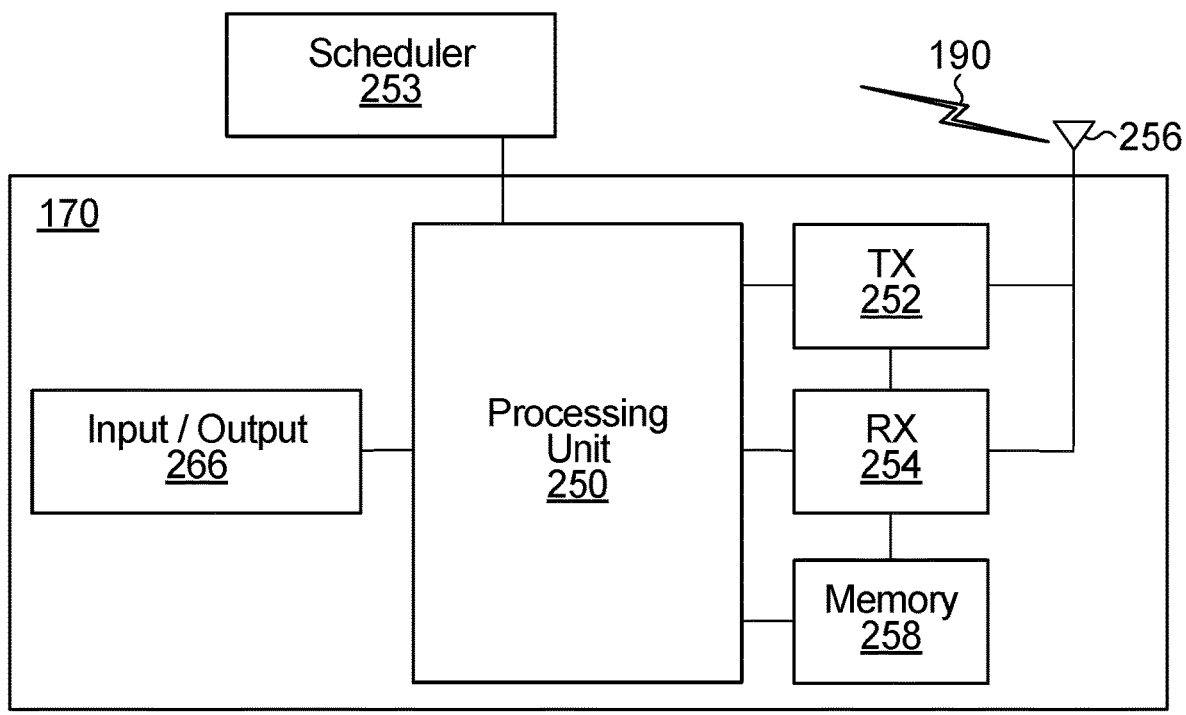
Figure 2C:
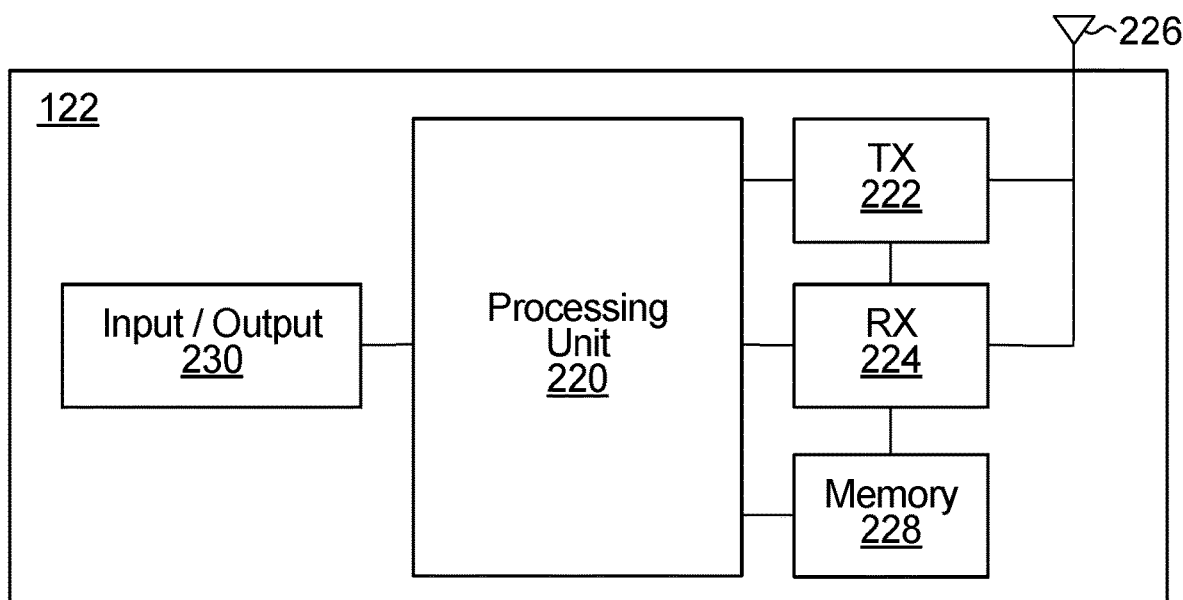

FIGS. 2A, 2B and 2C illustrate example devices that may implement the methods and teachings according to this disclosure. In particular, FIG. 2A illustrates an example ED 110, FIG. 2B illustrates an example base station 170, and FIG. 2C illustrates an example sensing agent 122. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, bit scrambling, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described elsewhere herein and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, bit scrambling, data processing, power control, input/output processing, or any other functionality. The processing unit 250 can also be configured to implement some or all of the functionality and/or embodiments described in more detail elsewhere herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described elsewhere herein and that are executed by the processing unit(s) 250.

Each input/output device 266 permits interaction with a user or other devices in the network. Each input/output device 266 includes any suitable structure for providing information to or receiving/providing information from a user, including network interface communications.

Additional details regarding the UEs 110 and the base stations 170 are known to those of skill in the art. As such, these details are omitted here for clarity.

As shown in FIG. 2C, the sensing agent 122 includes at least one processing unit 220, at least one transmitter 222, at least one receiver 224, one or more antennas 226, at least one memory 228, and one or more input/output devices or interfaces 230. A transceiver, not shown, may be used instead of the transmitter 222 and receiver 224. The processing unit 220 implements various processing operations of the sensing agent 122, such as signal coding, bit scrambling, data processing, power control, input/output processing, or any other functionality. The processing unit 220 can also be configured to implement some or all of the functionality and/or embodiments described in more detail elsewhere herein. Each processing unit 220 includes any suitable processing or computing device configured to perform one or more operations. Each processing unit 220 could, for example, include a microprocessor, microcontroller, digital signal processor, field programmable gate array, or application specific integrated circuit.

Each transmitter 222 includes any suitable structure for generating sensing signals for wireless transmission. Each receiver 224 includes any suitable structure for processing sensing signals received wirelessly. Although shown as separate components, at least one transmitter 222 and at least one receiver 224 could be combined into a transceiver. In some embodiments, a sensing agent may only transmit or receive sensing signals. This may be the case in bistatic sensing, for example. In some embodiments, a sensing agent only transmits sensing signals, and the reflections of these sensing signals could be received by other sensing nodes. In some embodiments, a sensing agent receives reflections of sensing signals, but does not transmit sensing signals. Therefore, some sensing agents might only include one of a transmitter and a receiver. As such, for the sensing agent 122, the at least one transmitter 222 or the at least one receiver 224 could be optional.

Each antenna 226 includes any suitable structure for transmitting and/or receiving wired or wireless signals. Although a common antenna 226 is shown here as being coupled to both the transmitter 222 and the receiver 224, one or more antennas 226 could be coupled to the transmitter(s) 222, and one or more separate antennas 226 could be coupled to the receiver(s) 224. Each memory 228 includes any suitable volatile and/or non-volatile storage and retrieval device(s) such as those described above in connection to the ED 110. The memory 228 stores instructions and data used, generated, or collected by the sensing agent 122. For example, the memory 228 could store software instructions or modules configured to implement some or all of the functionality and/or embodiments described elsewhere herein and that are executed by the processing unit(s) 220. Each input/output device 230 permits interaction with a user or other devices in the network.

Figure 3A:
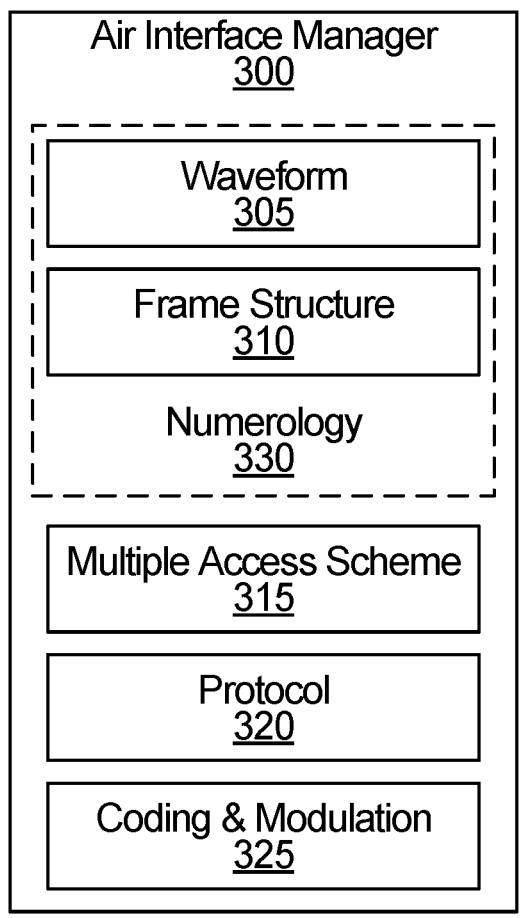
FIG. 3A is a block diagram of an air interface manager for configuring a software-configurable air interface according to an aspect of the present disclosure.

FIG. 3 illustrates a schematic diagram of an air interface manager 300 for configuring a software-configurable air interface 190. Air interface manager 300 may be, for example, a module comprising a number of components or building blocks that define the parameters of the air interface 190 and collectively specify how a transmission is to be made and/or received by the air interface 190. The air interface manager 300 could also or instead define the parameters of sensing signals in the communication system 100.

The components of the air interface manger 300 include at least one of a waveform component 305, a frame structure component 310, a multiple access scheme component 315, a protocol component 320, and a coding and modulation component 325.

The waveform component 305 may specify a shape and form of a signal being transmitted. Waveform options may include orthogonal multiple access waveforms and non-orthogonal multiple access waveforms. Non-limiting examples of such waveform options include Single-Carrier (SC), Ultra Wideband (UWB), Frequency Modulated Continuous Wave (FMCW), Linear Frequency Modulated (LFM), Orthogonal Frequency Division Multiplexing (OFDM), Single-Carrier Frequency Division Multiple Access (SC-FDMA), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, and low Peak to Average Power Ratio Waveform (low PAPR WF). In some embodiments, a combination of waveform options is possible. A LFM-OFDM waveform is a non-limiting example of such a combination.

The frame structure component 310 may specify a configuration of a frame or group of frames. The frame structure component 310 may indicate one or more of a time, frequency, pilot signature, code, or other parameter of the frame or group of frames.

Non-limiting examples of frame structure options include: the number of symbols in the time slot, the number of time slots in the frame and the duration of each time slot (sometimes known as a transmission time interval, TTI, or a transmission time unit, TTU). The frame structure component may also specify whether the time slot is a configurable multi-level TTI, a fixed TTI, or a configurable single-level TTI. The frame structure component may further specify a co-existence mechanism for different frame structure configurations.

For some waveforms, such as certain OFDM-based waveforms, the frame structure component may also specify one or more associated waveform parameters, such as subcarrier spacing width, symbol duration, cyclic prefix (CP) length, channel bandwidth, guard bands/subcarriers, and sampling size and frequency.

Additionally, the frame structure component 310 may further specify whether the frame structure is used in a time-division duplex communication or a frequency-division duplex communication.

Figure 3B:
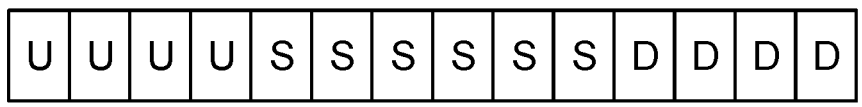
FIGS. 3B and 3C are diagrams illustrating example transmission frames according to aspects of the present disclosure.
Figure 3C:
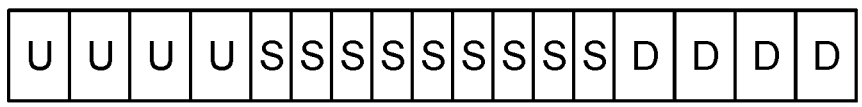

Additionally, the frame structure component 310 may further specify the transmission state and/or direction for each symbol in a frame. For example, each symbol may independently be configured as a downlink symbol, an uplink symbol, a flexible symbol or a sensing symbol. A sensing signal may be transmitted or received in a sensing symbol. An example is shown in FIG. 3B, which illustrates a transmission frame 350 including uplink (U), sensing (S) and downlink (D) symbols. Note that the sensing symbols can be configured to have a different numerology than the uplink and/or downlink symbols. For example, the sensing symbols can be configured to have a shorter length than the uplink/downlink symbols. This is shown in FIG. 3C, which illustrates a transmission frame 360 including uplink (U), sensing (S) and downlink (D) symbols. The sensing symbols in the transmission frame 360 are configured to have a shorter length than the sensing symbols in the transmission frame 350.

Together, the specifications of the waveform component and the frame structure component are sometimes known as the "numerology." Thus, the air interface 190 may include a numerology component 330 defining a number of air interface configuration parameters, such as the sub-carrier spacing, CP length, symbol length, slot length, and symbols per slot.

These numerologies, also known as subcarrier spacing configurations, may be scalable in the sense that subcarrier spacings of different numerologies are multiples of each other, and time slot lengths of different numerologies are also multiples of each other. Such a scalable design across multiple numerologies provides implementation benefits, for example scalable total OFDM symbol duration in a time division duplex (TDD) context.

Frames can be configured using one or a combination of scalable numerologies. For example, a numerology with 60 kHz subcarrier spacing has a relatively short OFDM symbol duration (because OFDM symbol duration varies inversely with subcarrier spacing), which makes the 60 kHz numerology particularly suitable for ultra-low latency communications, such as Vehicle-to-Any (V2X) communications. A further example of a numerology with a relatively short OFDM symbol duration suitable for low latency communications is a numerology with 30 kHz subcarrier spacing. A numerology with 15 kHz subcarrier spacing maybe compatible with LTE or serve as a default numerology for initial access of a device to a network. This 15 kHz numerology may also be suitable for broadband services. A numerology with 7.5 kHz spacing, which has a relatively long OFDM symbol duration, may be particularly useful for coverage enhancement and broadcasting. Additional uses for these numerologies will be or become apparent to persons of ordinary skill in the art. Of the four numerologies listed, those with 30 kHz and 60 kHz subcarrier spacings are more robust to Doppler spreading (fast moving conditions), because of the wider subcarrier spacing. It is further contemplated that different numerologies may use different values for other physical layer parameters, such as the same subcarrier spacing and different cyclic prefix lengths. In addition, subcarrier spacing may depend on the operational frequency band. For example, the subcarrier spacing in millimeter wave frequencies may be higher than in lower frequencies.

It is further contemplated that other subcarrier spacings may be used, such as higher or lower subcarrier spacings. For example, other subcarrier spacings varying by a factor of $2^n$ include 120 kHz and 3.75 kHz.

In other examples, a more limited scalability may be implemented, in which two or more numerologies all have subcarrier spacings that are integer multiples of the smallest subcarrier spacing, without necessarily being related by a factor of $2^n$. Examples include 15 kHz, 30 kHz, 45 kHz, 60 kHz subcarrier spacings.

In still other examples, non-scalable subcarrier spacings may be used, which are not all integer multiples of the smallest subcarrier spacing, such as 15 kHz, 20 kHz, 30 kHz, 60 kHz.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple electronic devices (EDs), which may be user equipments (UEs).

The use of different numerologies can allow the air interface 190 to support coexistence of a diverse set of use cases having a wide range quality of service (QoS) requirements, such as different levels of latency or reliability tolerance, as well as different bandwidth or signaling overhead requirements. In one example, the base station can signal to the ED an index representing a selected numerology, or a single parameter (e.g., subcarrier spacing) of the selected numerology. Based on this signaling, the ED may determine the parameters of the selected numerology from other information, such as a look-up table of candidate numerologies stored in memory.

Continuing with the components of the air interface 190, the multiple access scheme component 315 may specify how access to a channel is granted for one or more EDs. Non-limiting examples of multiple access technique options include technologies defining how EDs share a common physical channel, such as: Time Division Multiple Access (TDMA), Frequency Division Multiple Access (FDMA), Code Division Multiple Access (CDMA), Space Division Multiple Access (SDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, the multiple access technique options may include scheduled access, non-scheduled access, also known as grant-free access, non-orthogonal multiple access, orthogonal multiple access, e.g., via a dedicated channel resource (i.e., no sharing between multiple EDs), contention-based shared channel resource, non-contention-based shared channel resource, and cognitive radio-based access.

The protocol component 320 may specify how a transmission and/or a re-transmission are to be made. Non-limiting examples of transmission and/or re-transmission mechanism options include those that specify a scheduled data pipe size and a signaling mechanism for transmission and/or re-transmission.

The coding and modulation component 325 may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes, and polar codes. Modulation may refer, simply, to Quadrature Amplitude Modulation (QAM) specified by a complex constellation (including, for example, the modulation technique and order, e.g. 16QAM, 64QAM, etc.), or more specifically to various types of advanced modulation methods such as hierarchical modulation, multi-dimensional modulation and low Peak-to-Average Power Ratio (PAPR) modulation.

Because an air interface comprises a plurality of components or building blocks, and each component may have a plurality of candidate technologies (also referred to herein as air interface capability options), the air interface manager 300 may configure and store a large number of different air interface profiles. Each air interface profile defines a respective set of air interface capability options.

For example, in each air interface profile defining a respective set of air interface capability options, an air interface capability option is selected for each of the component building blocks of the air interface. Each of the different air interface profiles may be targeted to meet a different set of transmission requirements, including transmission content, transmit condition, and receive condition.

According to the transmission requirements of a pair of communicating transmitting-receiving devices, one of the different air interface profiles that best meet the transmission requirements may be selected from the air interface manager 300 and used for communications between the pair of communicating transmitting-receiving devices.

In further embodiments, the air interface manager 300 may modify or update its components, profiles, or capability options. For example, the air interface manager 300 may replace the waveform and frame structure components 305, 310, with a single numerology component 330. Conversely, the air interface manager 300 may separate the coding and modulation component 325 into an individual coding component and an individual modulation component. Furthermore, the air interface manager 300 is configurable such that new soft air interface configuration components developed in the future should be able to be utilized.

The air interface manager 300 may also update certain components to modify the capability options of any given component. For example, the air interface manager 300 may update the modulation and coding component 325 to include higher-order modulation schemes.

By updating the stored components, profiles, and candidate options, the air interface manager 300 can flexibly adapt to better accommodate diverse wireless traffic types and services. Modifying or updating components, profiles, and candidate options may allow the air interface manager 300 to provide suitable air interface profiles for traffic types or services other than those already contemplated for ultra-reliable low latency communications (URLLC), enhanced mobile broadband (eMBB), and massive machine-type communications (mMTC).

Figure 4:
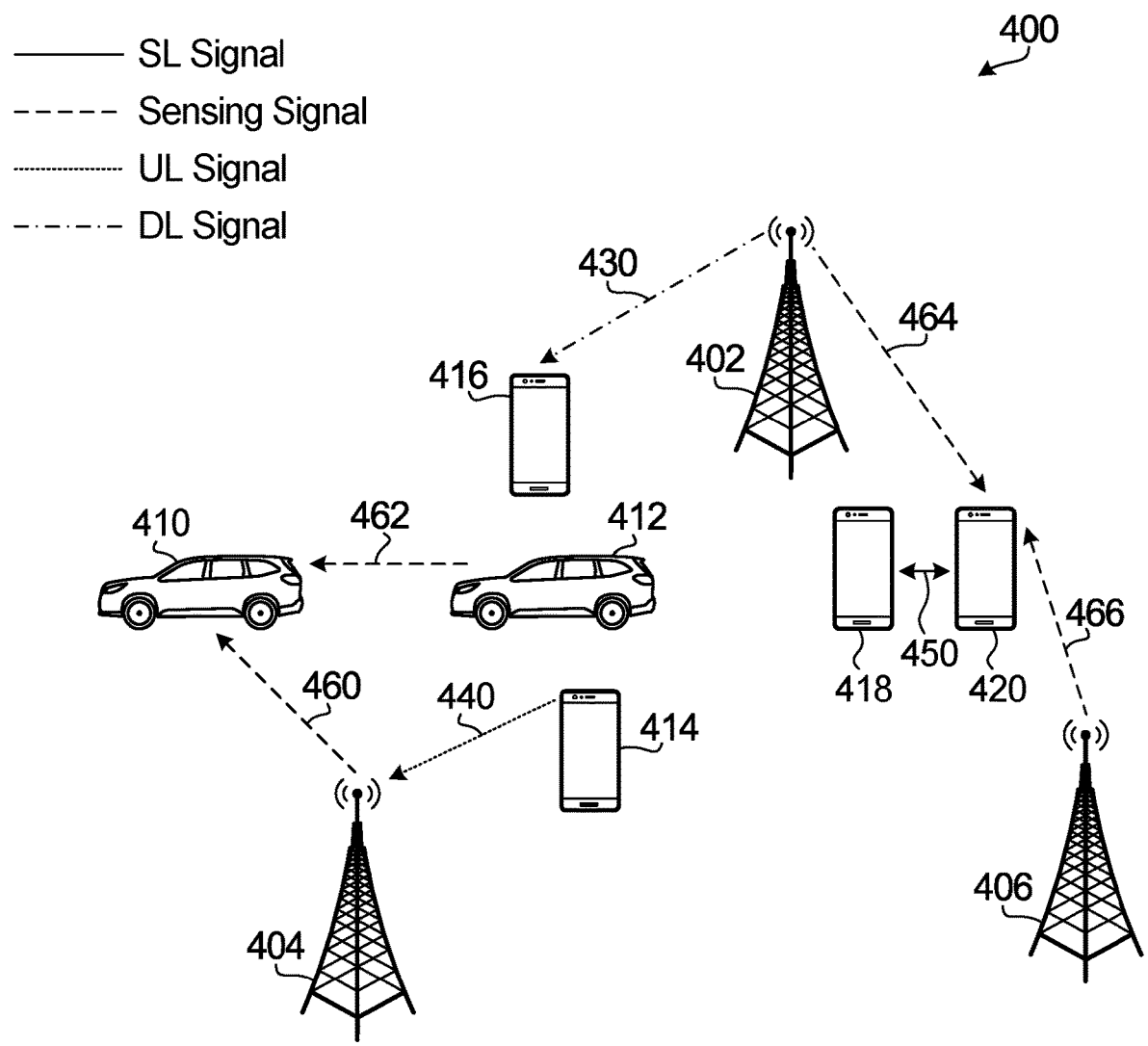
FIG. 4 is a diagram illustrating a first example communication system implementing sensing according to aspects of the present disclosure.

FIG. 4 is a diagram illustrating an example communication system 400 implementing sensing. The communication system 400 includes multiple transmission and receive points (TRPs) 402, 404, 406, and multiple UEs 410, 412, 414, 416, 418, 420. The UEs 410, 412 are illustrated as vehicles and the UEs 414, 416, 418, 420 are illustrated as cell phones, however this is only an example.

The TRP 402 is a base station that transmits a downlink (DL) signal 430 to the UE 416. The DL signal 430 is an example of a communication signal carrying data. The TRP 402 also transmits a sensing signal 464 in the direction of the UEs 418, 420. Therefore, the TRP 402 is involved in sensing and is considered to be a sensing node.

The TRP 404 is a base station that receives an uplink (UL) signal 440 from the UE 414, and transmits a sensing signal 460 in the direction of the UE 410. The UL signal 440 is an example of a communication signal carrying data. Since the TRP 404 is involved in sensing, this TRP is considered to be a sensing node as well as a communication node.

The TRP 406 transmits a sensing signal 466 in the direction of the UE 420, and therefore this TRP is considered to be a sensing node. The TRP 406 may or may not transmit or receive communication signals in the communications system 400. In some embodiments, the TRP 406 could be replaced with a sensing agent (SA) that is dedicated to sensing, and does not transmit or receive any communication signals in the communication system 400.

The UEs 410, 412, 414, 416, 418, 420 are all capable of transmitting and receiving communication signals on UL, DL and/or SL. For example, the UEs 418, 420 are communicating with each other via SL signals 450. At least some of the UEs 410, 412, 414, 416, 418, 420 are also sensing nodes in the communication system 400. By way of example, the UE 412 transmits a sensing signal 462 in the direction of the UE 410, and therefore the UE 412 is considered to be a sensing node.

The sensing nodes in the communication system 400 could implement monostatic and/or bistatic sensing. In the case of monostatic sensing, the transmitter of a sensing signal also receives a reflection of the sensing signal to determine the properties of one or more objects. In one example, the TRP 404 could receive a reflection of the sensing signal 460 from the UE 410 and potentially determine properties of the UE 410 based on the reflection of the sensing signal. In another example, the UE 412 could receive a reflection of the sensing signal 462 and potentially determine properties of the UE 410.

In the case of bistatic sensing, the receiver of a reflected sensing signal is different from the transmitter of the sensing signal. Any or all of the UEs 410, 412, 414, 416, 418, 420 could be involved in sensing by receiving reflections of the sensing signals 460, 462, 464, 466. Similarly, any or all of the TRPs 402, 404, 406 could receive reflections of the sensing signals 460, 462, 464, 466.

In one example, the sensing signal 464 could be reflected off of the UE 420 and be received by the TRP 406. It should be noted that a sensing signal might not physically reflect off of a UE, but could instead reflect off an object that is associated with the UE. For example, the sensing signal 464 could reflect off of a user or vehicle that is carrying the UE 420. The TRP 406 could determine certain properties of the UE 420 based on a reflection of the sensing signal 464, including the range, location, shape, speed and/or velocity of the UE 420, for example. In some implementations, the TRP 406 transmits information pertaining to the reflection of the sensing signal 464 to the TRP 402, and/or to any other network entity. The information pertaining to the reflection of the sensing signal 464 could include the time that the reflection was received, the time-of-flight of the sensing signal (for example, if the TRP 406 knows when the sensing signal was transmitted), the carrier frequency of the reflected sensing signal, the angle of arrival of the reflected sensing signal, and/or the Doppler shift of the sensing signal (for example, if the TRP 406 knows the original carrier frequency of the sensing signal). Other types of information pertaining to the reflection of a sensing signal are also contemplated.

The TRP 402 could determine properties of the UE 420 based on the received information pertaining to the reflection of the sensing signal 464. If the TRP 406 has determined certain properties of the UE 420 based on the reflection of the sensing signal 464, such as the location of the UE 420, then the information pertaining to the reflection of the sensing signal 464 could also or instead include these properties.

In another example, the sensing signal 462 could be reflected off of the UE 410 and be received by the TRP 404. Similar to the example provided above, the TRP 404 could determine properties of the UE 410 based on the reflection of the sensing signal, and/or transmit information pertaining to the reflection of the sensing signal to another network entity, such as the UEs 410, 412.

In a further example, the sensing signal 466 could be reflected off of the UE 420 and be received by the UE 418. The UE 418 could determine properties of the UE 420 based on the reflection of the sensing signal, and/or transmit information pertaining to the reflection of the sensing signal to another network entity, such as the UE 420 and/or the TRPs 402, 406.

The sensing signals 460, 462, 464, 466 are transmitted along particular directions, and in general, a sensing node could transmit multiple sensing signals in multiple different directions. In some implementations, sensing signals are intended to sense the environment over a given area, and beam sweeping is one method to achieve this. Beam sweeping can be performed using analog beamforming to form a beam along a desired direction using phase shifters, for example. Digital beamforming and hybrid beamforming are also possible. During beam sweeping, a sensing node could transmit multiple sensing signals according to a beam sweeping pattern, where each sensing signal is beamformed in a particular direction.

The UEs 410, 412, 414, 416, 418, 420 are examples of objects in the communication system 400, any or all of which could be detected and measured using sensing signals. However, other types of objects could also be detected and measured using sensing signals. Although not illustrated in FIG. 4, the environment surrounding the communication system 400 could include one or more scattering objects that reflect sensing signals and potentially obstruct communication signals. For example, trees and/or buildings could at least partially block the path from the TRP 402 to the UE 420, and potentially impede communications between the TRP 402 and the UE 420. The properties of these trees and/or buildings could be determined based on a reflection of the sensing signal 464, for example.

In some embodiments, communication signals are configured based on the determined properties of one or more objects. The configuration of a communication signal could include, but is not limited to, the configuration of a numerology, waveform, frame structure, multiple access scheme, protocol, beamforming direction, coding scheme and/or modulation scheme. Any or all of the communication signals 430, 440, 450 could be configured based on the properties of the UEs 414, 416, 418, 420. In one example, the location and velocity of the UE 416 could be used to help determine a suitable configuration for the DL signal 430. The properties of any scattering objects between the UE 416 and the TRP 402 could also be used to help determine a suitable configuration for the DL signal 430. Beamforming could be used to direct the DL signal 430 towards the UE 416 and to avoid any scattering objects. In another example, the location and velocity of the UE 414 could be used to help determine a suitable configuration for the UL signal 440. The properties of any scattering objects between the UE 414 and the TRP 404 could also be used to help determine a suitable configuration for the UL signal 440. Beamforming could be used to direct the UL signal 440 towards the TRP 404 and to avoid any scattering objects. In a further example, the location and velocity of the UEs 418, 420 could be used to help determine a suitable configuration for the SL signals 450. The properties of any scattering objects between the UEs 418, 420 could also be used to help determine a suitable configuration for the SL signals 450. Beamforming could be used to direct the SL signals 450 to either or both of the UEs 418, 420 and to avoid any scattering objects.

The properties of the UEs 410, 412, 414, 416, 418, 420 could also or instead be used for purposes other than communications. For example, the location and velocity of the UEs 410, 412 could be used for the purpose of autonomous driving.

The transmission of sensing signals 460, 462, 464, 466 and communication signals 430, 440, 450 could potentially result in interference in the communication system 400, which can be detrimental to both communication and sensing operations. Some aspects of the present disclosure relate to sensing signal configurations that enable the coexistence of sensing signals and communication signals in a communication network. Such coexistence can be achieved using sensing signal configurations that can at least partially avoid interference with communication signals and/or other sensing signals.

In the sensing period, each sensing agent sends a sensing reference signal (SeRS) which can be in-band or out-of-band with any communications signals that may be occurring. A sensing cycle, i.e. the period of time in which sensing is performed at the sensing agent, can be included in the uplink slots (for time divisional duplex (TDD)) or in uplink band (for frequency divisional duplex (FDD)) of an associated TRP to make sure the corresponding TRP is not transmitting at the same time. During the sensing cycle, knowing the SeRS sent by the sensing agent, each TRP can estimate sensing information through common methods in radar estimation. As SeRS potentially interferes with uplink transmissions, there are different ways of dealing with such interference.

One way to deal with interference involves joint radar estimation and data decoding. Depending on receiver capability at the TRP, the TRP may be able to jointly decode an uplink transmission while estimating the sensing parameters. This can be done, for example, by utilizing maximum likelihood estimation (MLE) or a simplification of MLE. Estimating the sensing parameters can also be performed using successive interference cancellation (SIC), e.g. the TRP can decode the uplink transmission assuming the sensing signal as interference and then remove the uplink transmission from the received signal and perform sensing detection. In some embodiments, these steps can be done in reverse order, i.e. the TRP can first estimate the sensing parameters in the presence of uplink interference and then, after removing the sensing signal, the TRP can decode the uplink transmission.

Another way to deal with interference involves interference suppression by utilizing receiver beamforming. In the case where the receiver has multiple antennas and one or more uplink transmission and one or more SeRS are received from different directions, receiver beamforming can be used to separate the one or more uplink transmission and the one or more sensing signal.

A further way to deal with interference involves scheduling and power control for uplink users to make sure the interference is minimized and manageable.

Sensing signal configurations can be target-specific and/or sensing node-specific. Target-specific means that the sensing signal is configured for a particular target. These targets could include UEs and scattering objects, for example. In some implementations, target-specific sensing signals improve the sensing performance for particular targets. Target-specific parameters could be obtained by a sensing node through measurement, training, and/or based on some desired performance indicator. This desired performance indicator could include, but is not limited to, target classification results (for example, whether the target is low-mobility or high-mobility), and desired sensing quality.

Sensing-node specific means that the sensing signal is configured for a particular sensing node. In some implementations, sensing node-specific sensing signals improve the sensing performance for particular sensing nodes. For example, a sensing node-specific sensing signal configuration can be based on the properties and requirements of the sensing node that will transmit and/or receive the sensing signal. Possible benefits of implementing target-specific and/or sensing node-specific sensing signal configurations include the flexibility to adjust the configuration of a sensing signal based on a desired sensing quality, and/or to reduce interference between sensing signals from different sensing nodes. Target-specific and/or sensing node-specific configurations can be applied to both in-band sensing and out-of-band sensing.

Some sensing node-specific sensing signal configurations are based on, and possibly include, unique identifiers that are specific to the transmitter of the sensing signal. The unique identifiers could allow the transmitter of a sensing signal to be determined by other network entities that receive the sensing signal. For example, in some embodiments, any or all sensing nodes in a network are assigned a respective sensing node identifier (ID). The sensing node ID is an example of a unique identifier that is specific to the transmitter of a sensing signal. Sensing node IDs could be the same as, or at least be associated with, other network IDs such as cell IDs and UE IDs. Alternatively, sensing node IDs could be configured independently. In some implementations, the sensing node ID is at least partially configured and/or assigned by the network, and could be communicated to a sensing node via higher-layer signaling, such as radio resource control (RRC) signaling or medium access control (MAC) control element (CE) signaling, for example. In some implementations, a sensing node determines its sensing node ID based on another network ID assigned to the sensing node. The sensing node could also, or instead, determine the sensing node IDs of other sensing nodes in the network based on their assigned network IDs. Sensing signal configurations for a particular sensing node can be based on, or mapped to, the sensing node ID that is associated with that sensing node.

Parameters that can be included in a sensing signal configuration will now be discussed in detail. However, these parameters are provided by way of example only, and are not intended to be limiting. In general, a sensing signal configuration can include any set of parameters.

In some embodiments, a sensing signal configuration includes a waveform configuration. Depending on the type of waveform used for a sensing signal, several possible parameters may be set in order to improve the performance of the sensing signal in a communication network. For example, a numerology for the sensing signal configuration may be set based on the type of waveform that is configured. Improving the performance of a sensing signal could include, but is not limited to, improving the range resolution and velocity resolution of the sensing signal, and reducing interference with communication signals and/or other sensing signals.

Using a waveform that is compatible with both communications and sensing operations could improve the performance of both operations, and reduce complexity for some sensing nodes. For example, the same receivers could be used for receiving sensing signals and for receiving communication signals. In addition, using a waveform that is compatible with both communications and sensing operations enables joint detection and/or processing of sensing and communication signals to improve the detection of both. Sensing signals and communication signals could also use the same frame structure and/or numerology (for example, subcarrier spacing, cyclic prefix (CP) length, etc.), which could also improve performance and reduce complexity.

Orthogonal frequency division multiplexing (OFDM) waveforms could be used for sensing signals, and can achieve suitable sensing performance in some implementations. Radar sensing using OFDM waveforms has been investigated in the following studies: Braun, M., Sturm, C., Jondral, F. K. "*Maximum likelihood speed and distance estimation for OFDM radar*". *Proc.* 2010 *IEEE Radar Conf.*, Washington, D.C., May 2010, pp. 256-261; Braun, M., Sturm, C., Niethammer, A., Jondral, F. "*Parameterization of joint OFDM-based radar and communication systems for vehicular Applications*". *Proc.* 20*th IEEE Int. Symp. Personal, Indoor, Mobile Radio Communications*, Tokyo, Japan, September 2009, pp. 3020-3024; Donnet, B. J., Longstaff, I. D. "*Combining MIMO radar with OFDM communications*". *Proc. Third European Radar Conf.*, Manchester U.K., September 2006, pp. 37-40; Yang Yang and R. S. Blum, "*MIMO radar waveform design based on mutual information and minimum mean-square error estimation*", *Aerospace and Electronic Systems, IEEE Transactions on*, vol. 43, no. 1, pp. 330-343, January 2007; and C. Sturm and W. Wiesbeck, "*Waveform Design and Signal Processing Aspects for Fusion of Wireless Communications and Radar Sensing*", *Proceedings of the IEEE*, Volume: 99, Issue: 7, July 2011, pp. 1236-1259.

OFDM may be a suitable choice of waveform for in-band sensing and/or out-of-band sensing. In some embodiments, OFDM waveforms are used for communication signals and for sensing signals to allow for the joint detection and processing of sensing signals and communication signals. The numerologies of the OFDM waveforms for the communication signals and sensing signals could be the same or different.

In some embodiments, the numerology of an OFDM waveform could be selected to improve sensing performance and reduce interference between different sensing signals. Considering a sensing signal configuration with a cyclic prefix OFDM (CP-OFDM) waveform as an example, sub-carrier spacing, CP length/overhead, and sensing slot length (for example, the number of symbols included in each sensing cycle as well as the configuration of sensing symbols in the sensing cycle, e.g. contiguous symbols or distributed symbols) are parameters that may be set to possibly improve the performance of the sensing signal.

It should be noted that the present disclosure is not limited to any particular types or configurations of waveforms for sensing signals or communication signals. For example, a waveform configuration for a sensing signal could be single-carrier (where spreading sequences could be used for interference mitigation), multi-carrier, ultra-wide band, or frequency modulated continuous wave. In some embodiments, a waveform configuration can be target-specific and/or sensing node-specific.

Figure 5:
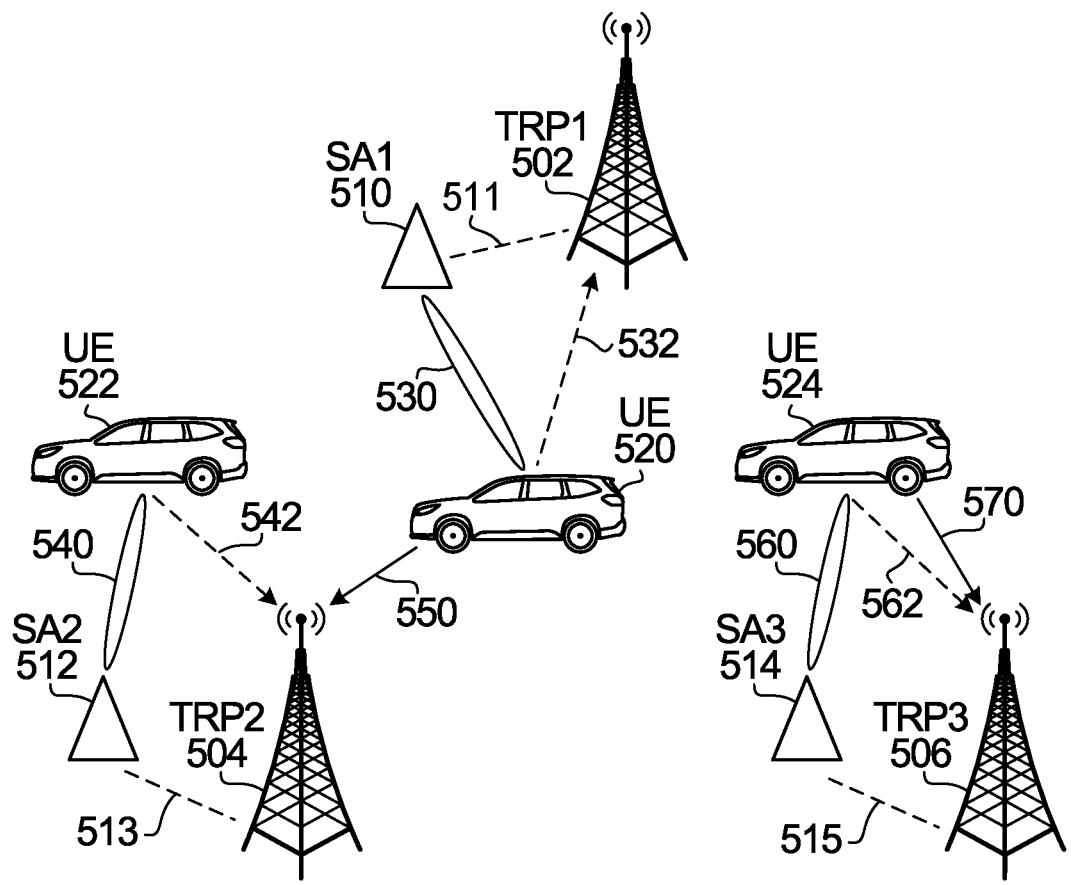
FIG. 5 is a diagram illustrating a second example communication system implementing sensing according to aspects of the present disclosure.

FIG. 5 is a diagram illustrating another example communication system 500 implementing sensing. The communication system 500 includes multiple transmission and receive points (TRPs) 502, 504, 506, multiple dedicated sensing agents (SAs) 510, 512, 514 and multiple UEs 520, 522, 524, which are illustrated as vehicles. It is to be understood however that this is only an example and UEs may be other types of devices such as cell phones and the like.

In FIG. 5, SA1 510 transmits a signal 530 that reflects off of UE 520. TRP1 502 is shown receiving a reflection 532 of the signal 530. TRP1 502 can then perform sensing parameter estimation for the surrounding environment based at least in part on reflection 532.

SA2 512 transmits a signal 540 that reflects off of UE 522. UE 520 is shown transmitting an uplink transmission 550. TRP2 504 is shown receiving a reflection 542 of the signal 540 and the uplink transmission 550 from UE 520. The reflection 542 and uplink transmission 550 are shown to be arriving at TRP2 504 from different directions. In this case, interference between uplink 550 and sensing signals 542 can be suppressed by receive beamforming, as described above. Other described methods could also be used if desired. TRP2 504 can then perform sensing parameter estimation for the surrounding environment based at least in part on reflection 542 once it has been appropriately detected.

SA3 514 transmits a signal 560 that reflects off of UE 524. UE 524 is also shown transmitting an uplink transmission 570. TRP3 506 is shown receiving a reflection 562 of the signal 560 and the uplink transmission 570 from UE 524. The reflection 562 and uplink transmission 570 are shown to be arriving at TRP3 506 from almost at the same direction. In this case, interference between uplink 570 and sensing signals 562 cannot be suppressed effectively by receive beamforming and other techniques, like joint detection and/or power control methods, can be utilized. TRP3 506 can then perform sensing parameter estimation for the surrounding environment based at least in part on reflection 562 once it has been appropriately detected.

Stand-Alone Dedicated Sensing Agent

Stand-alone sensing agents can be connected to one or more TRPs through backhaul. Examples of the connection are a wireless connection or fiber connection and shown as dashed line 511 between SA1 510 and TRP1 502, dashed line 513 between SA2 512 and TRP2 504 and dashed line 515 between SA3 514 and TRP3 506. Stand-alone sensing agents can be low cost devices as in their simplest form they do not have any data to transmit. In some embodiments, the sensing agent does not perform signal processing functions associated with data transmission. In addition, such simple formed sensing agent may not be equipped with a receiver front-end. However, in some embodiments, if the sensing agent is equipped with a receiving front-end, then the sensing agent may be capable of performing passive sensing. As a sensing agent is configured to transmit the SeRS in the UL slot of the corresponding TRP in a half-duplex arrangement, the sensing agent is not transmitting and available to perform passive sensing when the corresponding TRP is in a downlink portion of the transmission resource. Therefore, the sensing agent can perform passive sensing of the environment by reception of the reflection of the DL signal based on at least the two following scenarios.

A first scenario involves opportunistic sensing. Opportunistic sensing occurs when the corresponding TRP is not performing active sensing operation in the downlink and just performs data transmission. In this case, the sensing agent can perform passive sensing and sends the sensing information to the corresponding TRP, or any other TRPs that may be within range, for further processing. This sensing information can be related to the range, shape, and velocity of targets over the direction in which the downlink signal is transmitted on.

A second scenario involves scheduled sensing. Scheduled sensing is related to the case that the corresponding TRP performs active sensing simultaneously as data transmission in downlink. In this case, a sensing beam is swept by the corresponding TRP to cover an area of interest and the sensing agent can detect and process the reflected signal and forward the sensing information to the corresponding TRP for further processing. This sensing information can be related to the range and velocity of targets over the direction in which the sensing signal is transmitted on. The sensing agent can be instructed by the corresponding TRP to perform the passive sensing by, for example, sensing a "passive_sensing_request" through X2/Xn signalling.

When there are multiple sensing agents associated with a single TRP, enhanced sensing in the downlink time slot can occur by having multiple copies of the sensing signal received by SAs after reflection. This provides sensing diversity by having multiple observations of the same environment. Also, a sensing agent can perform passive sensing over multiple sensing signals sent by multiple neighboring TRPs. As the sensing signals generated by different TRPs can have different seeds/patterns/sequences, the sensing agent can distinguish them during reception. All the received information can be transmitted to the corresponding TRP and the TRP can forward the information to neighboring TRPs, if desired.

In order to have efficient sensing transmission/reception, sensing agents can be assigned different sensing IDs by the network. In a case of stand-alone sensing agents, the sensing ID can be associated with a TRP identifier (ID) or it can be a separate ID. This helps sensing agents to associate the parameters of a sensing signal to the ID and hence, facilitates better sensing detection at the receiver nodes and better SeRS interference mitigation.

In some embodiments, using stand-alone dedicated sensing agents enables sensing in half duplex networks with low cost and high efficiency.

In some embodiments, using stand-alone dedicated sensing agents provides additional information to the network to improve the communications performance.

User Equipment as Sensing Agent

In some embodiments, a UE can perform the functions of a sensing agent. When the UE acts as a sensing agent, the active sensing (transmission of SeRS) is performed as a result of a request by a serving TRP. In this case, the UE can be allocated a Sensing Node (SeN) ID, which is signaled using L1 signalling or higher layer signaling, examples of which are radio resource control (RRC) signaling and media access control (MAC) control elements (CEs). It is also possible that the SeN ID is assigned or pre-configured to the UE through higher layer signaling, but an indication like "SeN_enable" is assigned by the network through L1 signalling to indicate a request for active sensing. The request can be initiated based upon the location of the UE or by some event (e.g. blockage of packets for some UEs in certain areas). The sensing UE can also be chosen based on the mobility of the UE, for example, stationary UEs are preferred for sensing purposes as the location information for the sensing agent is more stable and not changing. In some embodiments, UEs as sensing agents can be chosen based on transmission and/or processing power. For example, cars when considered as UEs have more capability in terms of power amplification and processing power than cell phones that typically have a particular battery limitation. Synchronization between UE and TRP clocks may be a criteria for UE selection as a sensing agent because tight synchronization is required (or at least the relative delays are to be known through receiving uplink packets for the same UE in the same location) for range estimation.

Once a UE is selected and assigned by the network for active sensing, some extra information can be signaled to the UE to indicate more details of the sensing. This may include some parameters of the sensing signal including a beam sweeping pattern, resource allocation and SeRS sequence length and some indications (explicit and/or implicit) for sensing quality and some level of knowledge of the environment (including the target classification results based on previous measurements, etc.). This extra information signalling can be L1 or higher layer signalling including RRC or MAC CE. It is also possible that the UE performs uplink transmission and active sensing at the same time by assigning two different beams for transmission and sensing which can be determined and signaled to the UE by the network.

Similar to stand-alone dedicated sensing agents, a UE used for sensing can perform passive sensing of the surrounding environment by reception of the reflection of a downlink signal from TRP. Selection of a UE as a passive sensing agent may also be dependent on the UE capability and power availability. For example, for UEs with reasonably good processing power and no battery constraint (such as cars) this would be feasible. The following are examples of passive sensing scenarios.

In opportunistic sensing, a corresponding TRP does not perform active sensing in downlink, but performs only data transmission. In this case, the UE as sensing agent performs passive sensing and sends sensing information to the corresponding TRP for further processing. The sensing information can be related to range, shape, and velocity of targets over a direction in which a downlink signal is transmitted by the corresponding TRP. In some embodiments, the UE feedback is done using L1 signalling. In some embodiments, the UE feedback is combined with other feedback signalling (e.g. channel quality indication (CQI) feedback) and can be sent using a same signalling mechanism as the other feedback signaling. Opportunistic sensing can also be performed for sidelink (SL) transmission between UEs.

In scheduled sensing, the corresponding TRP performs active sensing simultaneously with data transmission in downlink. In this case, a sensing beam is swept by the corresponding TRP to cover an area of interest and the UE as sensing agent can detect and process the reflected signal as sensing information. The UE can forward the sensing information to the TRP for further processing. The sensing information can be related to range, shape, and velocity of targets over the direction in which the sensing signal is transmitted by the corresponding TRP. In some embodiments, the UE can be configured by the corresponding TRP to perform the passive sensing by sensing a "passive_sensing_request" through L1 signalling or higher layer signalling including RRC or MAC CE. In some embodiments, the UE feedback can be provided to the corresponding TRP using L1 signalling. In some embodiments, the UE feedback is combined with other feedback signalling (e.g. CQI feedback) and is sent using the same signalling mechanism as the other feedback signalling. Scheduled sensing can also be performed for SL transmission in which the active sensing is performed by another UE. In this case, a "passive_sensing_request" can be sent by the UE performing the active sensing or by the network.

In some embodiments, utilizing UEs as sensing agents enables sensing in half duplex networks with low cost and high efficiency.

In some embodiments, utilizing UEs as sensing agents provides additional information to the network to improve the communications performance Transmit Receive Point as Sensing Agent In some embodiments, TRPs can be considered sensing agents. As a TRP cannot perform active sensing (transmitting the sensing signal) and passive sensing (reception and processing of the sensing signal) at the same time, one or more other TRP help in the sensing operation. As the primary operation of the TRP is communications (data transmission and reception), the sensing operation should not interrupt or disrupt the communications. For TRPs that are operating in a half-duplex manner, when the TRP performs active sensing, the receiver is to be in uplink mode (reception). Therefore, there must be coordination between one or more TRP acting as transmitter and one or more other TRP acting as receiver.

For illustration of the proposed scheme, one or more TRP responsible for the sensing operation are designated as primary TRP(s) and one or more TRP helping the primary TRP(s) with the sensing operation are designated as the helper TRP(s) or simply helper(s). While helpers are generally described to as being TRPs, it is possible that UEs could be helpers as well. The helper(s) can be associated with the primary TRP(s), for example they can be femto base stations, remote radio heads (RRH), relays or any other network nodes, or they can be independent TRPs. In a more general form, sensing scheduling can occur in the sense that there are a set of TRPs $\{TRP_i\}_{i=1}^{s}$ and at each sensing cycle, a subset of TRPs act as primary TRP(s) and the rest of the set act as helpers. In some embodiments, the subsets acting as primary TRP(s) and helpers alternate from one sensing cycle to another. This provides an opportunity to sense the entire environment efficiently.

Without loss of generality, the primary TRP(s) perform active sensing, i.e. they send sensing signal (SeRS) and the helpers perform passive sensing, i.e. listen to the reflection of SeRS from targets and try to estimate the sensing parameters. In some embodiments, the primary TRPs and the helpers roles are reversed in that the primary TRP(s) perform passive sensing and the helpers perform active sensing. In such a case, the sensing command (e.g. "passive_sense_enable") and configuration parameters of sensing signal(s) should be conveyed to the helpers to simplify reception. These configuration parameters may include, but are not limited to: SeN IDs; SeRS length and sequences; resource mapping pattern; and beam sweeping pattern. The signalling of the sensing command and configuration parameters can be performed through X2/Xn signalling. In some embodiments, when the sensing is performed in a pre-configured manner and primary/helper configuration of the TRPs is pre-defined, some or all of this information can be obtained by the helpers and therefore, no or little signalling is required. In this case, the pre-configuration information can be sent through higher layer signalling at the beginning of the sensing process with primary TRP(s) and helper(s).

In a half-duplex scenario, when sensing is performed, no downlink transmission should be performed from the helpers over the resources in which SeRS signals are transmitted. If the sensing is performed in a pre-configured manner and primary/helper configuration of the TRPs is pre-defined, the helper(s) can be provisioned such that no downlink transmission is scheduled on these resources. However, if the sensing is performed on an "on demand" basis i.e. only when requested, and the downlink transmission is already scheduled, the TRP serving a group of UEs can send notification to UEs scheduled during a given resource (or broadcast to all the UEs) through L1 signalling to let the UEs know about the scheduling change on those resources.

The decision on whether or not to schedule uplink transmission when passive sensing is performed depends in part on the receiver capability of the helper(s). For example, if receiver capability is high, i.e. the helper can jointly detect the sensing signal as well as uplink decoding, the primary TPR can schedule uplink transmission. However, some extra signalling might be required to ensure the decoding performance for both uplink transmission and sensing. For example, some indication regarding power control, transmission rank, and/or modulation and coding scheme (MCS) can be sent to the scheduled/configured UEs on these resources. This extra signalling can be through L1 signalling or through higher layer signalling including RRC or MAC CE.

In some embodiments, using TRPs as sensing agents, including the combination of primary TRP(s) and helper TRP(s) provides more sensing coverage by performing sensing over multiple TRPs.

In some embodiments, using TRPs as sensing agents, including the combination of primary TRP(s) and helper TRP(s) provides more sensing diversity and improves quality of the sensing.

A particular issue that arises due to the use of sensing agents (in the form of stand-alone dedicated sensing agents, TRPs and/or UEs) is interference generated by the sensing signals. Sensing signals can be in-band or out-of-band. For in-band sensing, sensing signals and communication signals are transmitted using the same set of physical resources. For example, a network entity could transmit communication signals and sensing signals over the same frequency band simultaneously or at different times. For out-of-band sensing, sensing signals are transmitted using a set of physical resources that is different from the set of physical resources used for communication signals. In some embodiments, the set of physical resources is dedicated to sensing. If the sensing is performed out-of-band, interference between sensing and communications signals is reduced significantly. An example of out-of-band sensing is sensing being performed in a millimeter wave band and communications are performed in a sub-6 GHz band.

When sensing is performed in-band, different solutions for interference mitigation can be considered, including one or more of the following.

Power control: because sensing is normally performed over a large bandwidth (to get a good ranging estimate), the power can be lowered to limit interference caused to the neighboring TRPs and/or UEs.

Beamforming configuration: because the sensing is performed by beam sweeping, the sweeping region can be designed in such a way to minimize interference to uplink communication signals and transmission of other TRPs (based on the information about the coverage area of the neighboring TRPs).

Sensing signal design: aspects of sensing signal design is described in applicants co-pending application Applicant's reference 86311801US01.

Managing Inter-Sensing Signal Interference

If the sensing signals from neighboring sensing agents are transmitted over the same frequency band, this results in interference when observed at a sensing receiver. Because the sensing signal is a type of reference signal, the structure of the signals transmitted from different nodes can impact on the inter-SeRS interference. For example, if the sensing signals of the neighboring sensing agents are designed to be orthogonal to each other, inter-sensing signal interference can be mitigated. In some embodiments, SeRS can be designed in a similar fashion to the manner of demodulated reference signal (DMRS) design in uplink with orthogonal or semi-orthogonal reference signal (RS) sequences and/or orthogonal or semi-orthogonal time/frequency resources. An aspect of the design process can also include having different SeRS ports for neighboring sensing agents (time/frequency scheduling of SeRS signals). Design of the SeRS may also pertain to power control and beamforming configuration as discussed above.

In some embodiments, the SeRS signals can be designed in advance and stored in a look up table (LUT) and TRPs are aware of the sensing signals of their neighboring sensing agents so they can select appropriate SeRS for different sensing agents. In other embodiments, the sensing signal parameters can be mapped to a sensing agent ID or a sensing node (SeN) ID which can be globally known in the network through initial signalling.

Methods of Interference Mitigation to the UEs:

The interference caused by the sensing signals to the TRPs on the uplink transmission of other TRPs can be handled relatively easily because TRPs normally have more information about the configuration of the sensing signals, their beam direction, etc., and TRPs have more processing power for signal detection and can cancel the interference caused by the neighboring sensing agents.

However, the sensing signal transmission by one sensing agent can potentially cause interference to UEs in the following scenarios.

Scenario 1—UE Receiving DL Transmission in Another Cell

This scenario happens in the flexible TDD scenario when one TRP is in uplink mode while another TRP is in downlink mode. In this case, the sensing signal from one sensing agent can cause interference to the UE receiving a downlink transmission in another cell. In some embodiments, this can be managed by the following:
1) Beam management of the sensing signal: since the TRPs may know each other's UL/DL configuration, the TRPs can pre-configure the beam sweeping patterns of their corresponding SA(s) such that no interference is caused to UEs in the coverage area of the other TRP.
2) Resource management of the sensing signal: In case multiple resource parts (bandwidth, time slots . . . ) are available for sensing, SA(s) can use the resource parts not used by the neighboring TRPs for DL transmission, this requires that the TRPs know the DL scheduling resources of the neighboring TRPs.
3) Power control: in the case where the sensing signal is sent over the same resource as the DL transmission, the sensing signal power can be controlled to mitigate interference caused to the DL UE.
4) Predictive interference mitigation: because the TRP knows the beam pattern of the neighboring SA(s), the TRP can signal the neighboring TRP in case the beam pattern is harmful for the upcoming DL transmission so that the TRP can halt the beam sweeping or change the pattern.

Scenario 2—UE Receiving Device-to-Device (D2D) Transmission

If a D2D link is established by the TRP, any of the above described techniques can be used to manage the interference.

However, if the D2D link is established in a UE-centric fashion, a "sense-before-talk" technique can be used for interference management. In sense-before-talk, the UE can first sense the frequency band to see if the UE detects the sensing signal. Then the UE can select the frequency band, transmission bandwidth and beamforming to make sure the receiver is not impacted by the sensing signal transmission. This idea can be useful because in some embodiments of D2D, the transmitter and receiver are relatively close together, so the signal power detected by the transmitter is approximately the same as the one detected by the receiver.

Interference management between SeRS signals sent by different nodes and minimizing the impact of sensing signals to communications signals and vice versa can be used to improve the performance of both sensing and communications in the system.

Examples of configuring and implementing sensing signals in a wireless communication network will now be described with reference to FIGS. 6 and 7.

Figure 6:
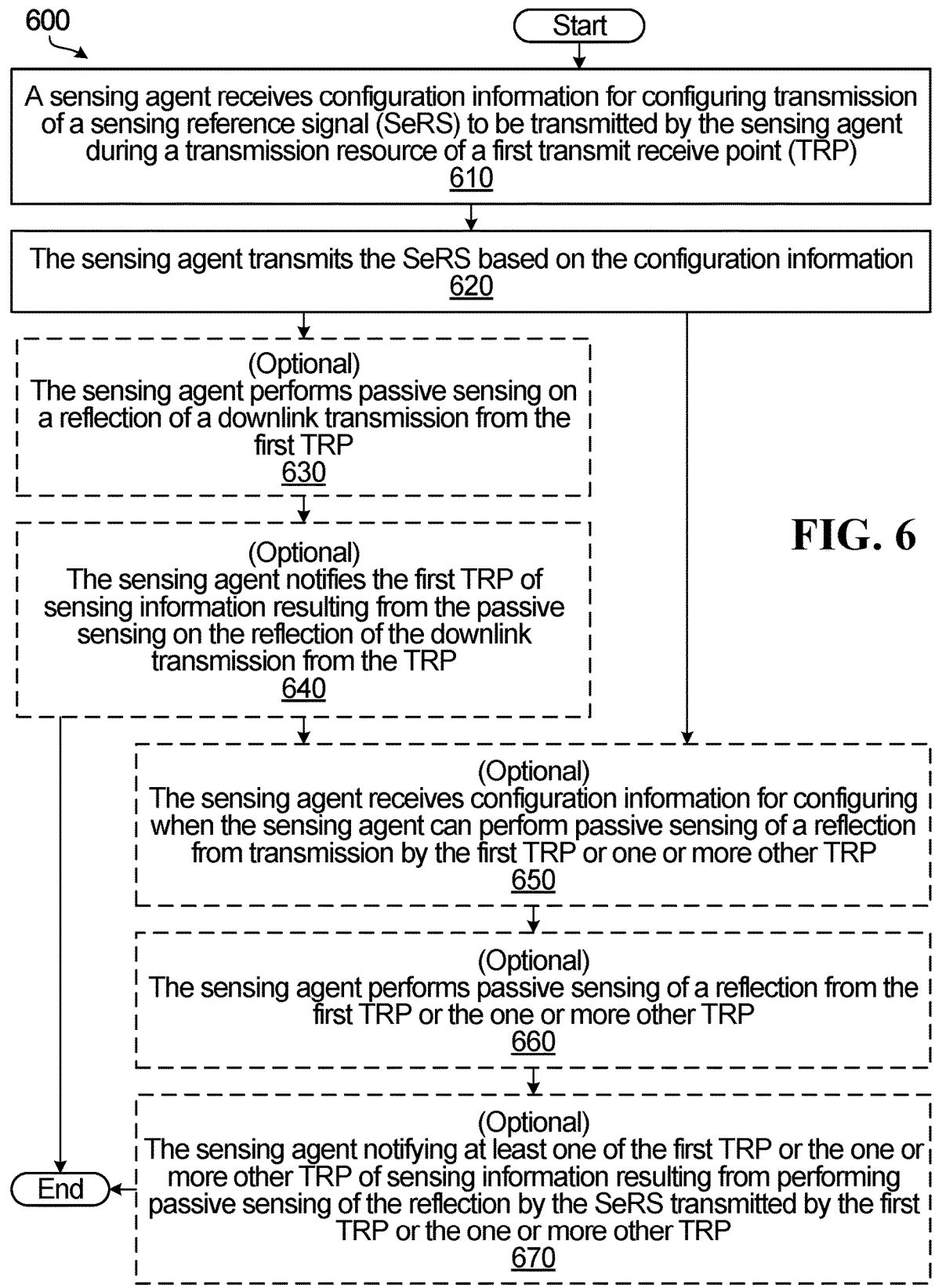
FIG. 6 is a flow diagram illustrating a first method according to an embodiment of the present disclosure.

FIG. 6 is a flow chart 600 describing a method for use in a telecommunication system. Step 610 involves a sensing agent receiving configuration information for configuring transmission of a sensing reference signal (SeRS) to be transmitted by the sensing agent during a transmission resource of a first transmit receive point (TRP). Step 620 involves the sensing agent transmitting the SeRS based on the configuration information. Step 630 is an optional step that further involves the sensing agent performing passive sensing on a reflection of a downlink transmission from the first TPR. This step may be performed is the sensing agent is configured to receive a reflected version of the SeRS. Step 640 is a further optional step to 630 that further involves the sensing agent notifying the first TRP of sensing information resulting from the passive sensing on the reflection of the downlink transmission from the TPR. Step 650 is an optional step that involves the sensing agent receiving configuration information for configuring when the sensing agent can perform passive sensing of a reflection from transmission by the first TRP or one or more other TRP. Step 660 is an optional step that involves the sensing agent performing passive sensing of a reflection from the first TRP or the one or more other TRP. Step 670 is an optional step that further involves the sensing agent notifying at least one of the first TRP or the one or more other TRP of sensing information resulting from performing passive sensing of the reflection by the SeRS transmitted by the first TRP or the one or more other TRP.

Figure 7:
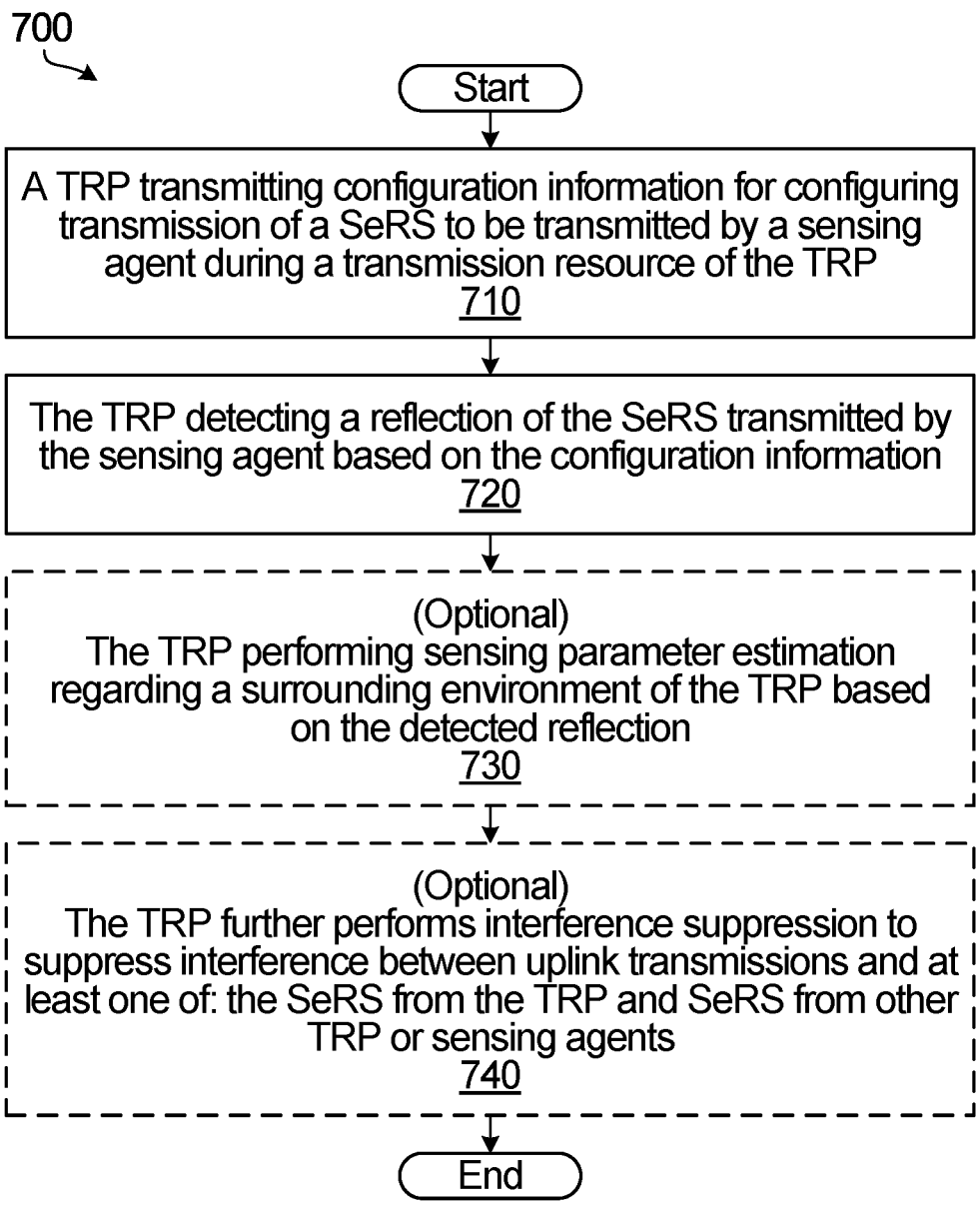
FIG. 7 is a flow diagram illustrating a second method according to an embodiment of the present disclosure.

FIG. 7 is a flow chart 700 describing a method for use in a telecommunication system. Step 710 involves a TRP transmitting configuration information for configuring transmission of a SeRS to be transmitted by a sensing agent during a transmission resource of the TRP. Step 720 involves the TRP detecting a reflection of the SeRS transmitted by the sensing agent based on the configuration information. Step 730 is an optional step that further involves the TRP performing sensing parameter estimation regarding a surrounding environment of the TRP based on the detected reflection. Step 740 is an optional step that involves the TRP further performing interference suppression to suppress interference between uplink transmissions and at least one of: the SeRS from the TRP and SeRS from other TRP or sensing agents. Performing interference suppression may include at least one of: joint radar estimation and data decoding using maximum likelihood estimation or successive interference cancellation; receiving beamforming to separate at least one reflected SeRS and uplink transmissions; and scheduling and power control for uplink users to minimize interference.

Figure 8:
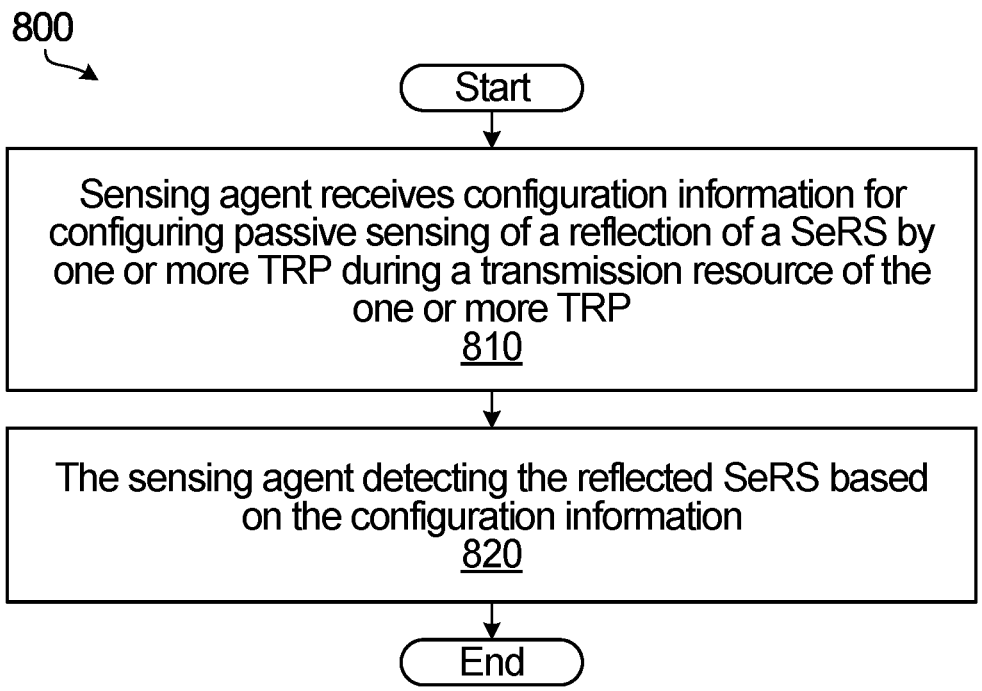
FIG. 8 is a flow diagram illustrating a third method according to an embodiment of the present disclosure.

FIG. 8 is a flow chart 800 describing a method for use in a telecommunication system. Step 810 involves a sensing agent receiving configuration information for configuring passive sensing of a reflection of a SeRS by one or more TRP during a transmission resource of the one or more TRP. Step 820 involves the sensing agent detecting the reflected SeRS based on the configuration information.

Figure 9:
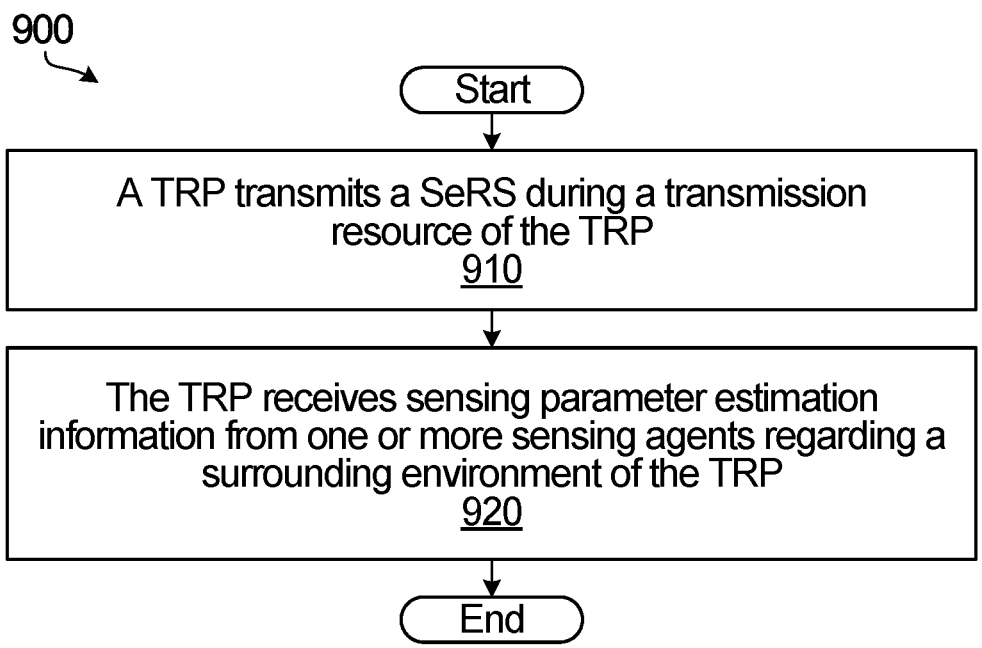
FIG. 9 is a flow diagram illustrating a fourth method according to an embodiment of the present disclosure.

FIG. 9 is a flow chart 900 describing a method for use in a telecommunication system. Step 910 involves a TRP transmitting a SeRS during a transmission resource of the TRP. Step 920 involves the TRP receiving sensing parameter estimation information from one or more sensing agents regarding a surrounding environment of the TRP.

While aspects of the description may pertain to half-duplex mode operation, it should be understood that aspects of the above described methodologies can be applied to full duplex mode operation as well.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for use in a telecommunication system comprising:
    transmitting, by a transmit receive point (TRP), a signaling message comprising configuration information in the form of parameter information for configuring transmission of a sensing reference signal (SeRS) to be transmitted by a sensing agent that is remote from the TRP during a transmission resource of the TRP; and
    receiving, by the TRP, a reflection of the SeRS transmitted by the sensing agent based on the configuration information.

2. The method of claim 1, the method further comprises:
    detecting, by the TRP, the reflection of the SeRs;
    performing, by the TRP, sensing parameter estimation regarding a surrounding environment of the TRP based on the detected reflection.

3. The method of claim 1, the method further comprising:
    performing, by the TRP, interference suppression to suppress interference between uplink transmissions and at least one of:
    SeRS transmitted by the TRP; and
    SeRS transmitted by other TRP or sensing agents.

4. The method of claim 3 wherein performing interference suppression comprises at least one of:
    joint radar estimation and data decoding using maximum likelihood estimation or successive interference cancellation;
    receiving beamforming to separate at least one reflected SeRS and uplink transmissions; and
    scheduling and power control for uplink users to minimize interference.

5. The method of claim 3 further comprising transmitting configuration information for configuring sensing of the reflection of the SeRS transmitted by the TRP during the transmission resource of the TRP.

6. The method of claim 3 further comprising:
    receiving, by the TRP, sensing parameter estimation information from one or more sensing agents regarding a surrounding environment of the TRP.

7. The method of claim 6 further comprising the TRP notifying neighboring TRPs of received sensing parameter estimation information from one or more sensing agents regarding the surrounding environment of the TRP.

8. The method of claim 1, wherein transmitting the configuration information occurs in one or more of:
    L1 signalling;
    radio resource control (RRC) signaling;
    media access control (MAC) control elements (CEs); and
    X2/Xn signaling.

9. The method of claim 6, wherein receiving sensing parameter estimation information occurs in one or more of:
    L1 signalling;
    Radio resource control (RRC) signaling;
    media access control (MAC) control elements (CEs); and
    X2/Xn signaling.

10. An apparatus, comprising one or more units for performing the method according to claim 1.

11. A transmit receive point (TRP) comprising:
    at least one processor; and
    a memory storing processor-executable instructions that, when executed, cause the at least one processor to:
        transmit a signaling message comprising configuration information in the form of parameter information for configuring transmission of a sensing reference signal (SeRS) to be transmitted by a sensing agent that is remote from the TRP during a transmission resource of the TRP; and
        receive a reflection of the SeRS transmitted by the sensing agent based on the configuration information.

12. The TRP of claim 11, wherein the processor-executable instructions when executed, cause the at least one processor to:
    detect the reflection of the SeRs; and
    perform sensing parameter estimation regarding a surrounding environment of the TRP based on the detected reflection.

13. The TRP of claim 11, wherein the processor-executable instructions when executed, cause the at least one processor to:
    perform interference suppression to suppress interference between uplink transmissions and at least one of:
    SeRS transmitted by the TRP; and
    SeRS transmitted by other TRP or sensing agents.

14. The TRP of claim 13, wherein the processor-executable instructions when executed, cause the at least one processor to:
    perform interference suppression comprising at least one of:
    joint radar estimation and data decoding using maximum likelihood estimation or successive interference cancellation;
    receiving beamforming to separate at least one reflected SeRS and uplink transmissions; and
    scheduling and power control for uplink users to minimize interference.

15. The TRP of claim 13, wherein the processor-executable instructions when executed, cause the at least one processor to:
  transmit configuration information for configuring sensing of the reflection of the SeRS transmitted by the TRP during the transmission resource of the TRP.

16. The TRP of claim 13, wherein the processor-executable instructions when executed, cause the at least one processor to receive sensing parameter estimation information from one or more sensing agents regarding a surrounding environment of the TRP.

17. The TRP of claim 16, wherein the processor-executable instructions when executed, cause the at least one processor to notify neighboring TRPs of received sensing parameter estimation information from one or more sensing agents regarding the surrounding environment of the TRP.

18. The TRP of claim 11, wherein the processor-executable instructions when executed, cause the at least one processor to transmit the configuration information in one or more of:
  L1 signalling;
  radio resource control (RRC) signaling;
  media access control (MAC) control elements (CEs); and
  X2/Xn signaling.

19. The TRP of claim 11, wherein the processor-executable instructions when executed, cause the at least one processor to receive sensing parameter estimation information in one or more of:
  L1 signalling;
  Radio resource control (RRC) signaling;
  media access control (MAC) control elements (CEs); and
  X2/Xn signaling.

* * * * *